(12) United States Patent
Roth et al.

(10) Patent No.: US 10,516,667 B1
(45) Date of Patent: Dec. 24, 2019

(54) HIDDEN COMPARTMENTS

(71) Applicant: Amazon Technologies, Inc., Reno, NV (US)

(72) Inventors: Gregory Branchek Roth, Seattle, WA (US); Anders Samuelsson, Redmond, WA (US); Bradley Jeffery Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 54 days.

(21) Appl. No.: 14/295,108

(22) Filed: Jun. 3, 2014

(51) Int. Cl.
*G06F 17/00* (2019.01)
*H04L 29/06* (2006.01)

(52) U.S. Cl.
CPC ............. *H04L 63/10* (2013.01); *H04L 63/08* (2013.01)

(58) Field of Classification Search
CPC ..... H04L 63/10; H04L 63/101; H04L 63/102; H04L 63/104
See application file for complete search history.

(56) References Cited

U.S. PATENT DOCUMENTS

| | | | |
|---|---|---|---|
| 6,279,153 B1 | 8/2001 | Bi et al. | |
| 6,996,817 B2 | 2/2006 | Birum et al. | |
| 7,996,525 B2 * | 8/2011 | Stienhans | G06F 9/5083 709/224 |
| 8,307,003 B1 * | 11/2012 | Sheth | G06F 16/958 707/790 |
| 9,021,009 B2 * | 4/2015 | Van Biljon | G06Q 30/04 709/201 |
| 9,166,797 B2 | 10/2015 | Kurien et al. | |
| 9,294,507 B1 | 3/2016 | Roth et al. | |
| 9,294,508 B2 | 3/2016 | Goldschlag et al. | |
| 2002/0073410 A1 | 6/2002 | Lundback et al. | |
| 2006/0074734 A1 | 4/2006 | Shukla et al. | |
| 2007/0169075 A1 | 7/2007 | Lill et al. | |
| 2007/0276951 A1 * | 11/2007 | Riggs | H04L 63/0428 709/229 |
| 2007/0283443 A1 * | 12/2007 | McPherson | G06F 21/6218 726/26 |
| 2008/0244579 A1 * | 10/2008 | Muller | G06F 9/5027 718/100 |
| 2009/0144183 A1 * | 6/2009 | Gatchell | G06Q 10/06 705/34 |
| 2009/0171496 A1 | 7/2009 | Furukawa et al. | |

(Continued)

FOREIGN PATENT DOCUMENTS

WO WO2014021834 * 2/2014 ............... G06F 9/06

OTHER PUBLICATIONS

"FAQs for AWS IAM," © 2014, Amazon Web Services, Inc., <http://aws.amazon.com/iam/faqs/>, 31 pages.

(Continued)

*Primary Examiner* — John B King
*Assistant Examiner* — Darshan I Dhruv
(74) *Attorney, Agent, or Firm* — Davis Wright Tremaine LLP

(57) ABSTRACT

A service of a service provider can cause a compartment to be created in an account of a customer of the service provider. Computing resources are provisioned in the compartment and the service has administrative authority over the computing resources. The customer may have administrative authority over the compartment, but may lack authority over the computing resources inside of the compartment.

20 Claims, 23 Drawing Sheets

(56) References Cited

U.S. PATENT DOCUMENTS

| | | |
|---|---|---|
| 2010/0217865 A1 | 8/2010 | Ferris |
| 2011/0055385 A1* | 3/2011 | Tung .................... G06F 9/5072 709/224 |
| 2011/0083138 A1* | 4/2011 | Sivasubramanian ....................... G06F 16/217 719/328 |
| 2011/0277016 A1 | 11/2011 | Hockings et al. |
| 2011/0295998 A1 | 12/2011 | Ferris et al. |
| 2011/0320605 A1 | 12/2011 | Kramer et al. |
| 2011/0321024 A1 | 12/2011 | Knothe et al. |
| 2012/0278861 A1* | 11/2012 | Lu ....................... H04L 63/0853 726/4 |
| 2013/0007845 A1* | 1/2013 | Chang .................... G06F 21/62 726/4 |
| 2013/0031028 A1* | 1/2013 | Martin .................... G06Q 30/08 705/400 |
| 2013/0055247 A1 | 2/2013 | Hiltgen et al. |
| 2013/0097275 A1* | 4/2013 | Wofford, IV ......... G06F 3/0605 709/213 |
| 2013/0227047 A1* | 8/2013 | Dolce .................... G06F 3/0605 709/213 |
| 2013/0239089 A1 | 9/2013 | Eksten et al. |
| 2014/0068584 A1 | 3/2014 | Lim et al. |
| 2014/0074999 A1* | 3/2014 | Khalsa ................ H04L 41/5041 709/223 |
| 2014/0075565 A1* | 3/2014 | Srinivasan ....... G06Q 10/06315 726/26 |
| 2014/0075568 A1* | 3/2014 | Sathyadevan ....... G06F 21/6218 726/27 |
| 2014/0123129 A1* | 5/2014 | Risbood ............. G06F 9/44505 717/176 |
| 2014/0129690 A1* | 5/2014 | Jaisinghani ........... G06F 9/5061 709/222 |
| 2014/0130056 A1 | 5/2014 | Goodman et al. |
| 2014/0172807 A1 | 6/2014 | Chatley et al. |
| 2014/0195927 A1 | 7/2014 | DeWeese et al. |
| 2014/0244667 A1 | 8/2014 | Bararsani et al. |
| 2014/0280961 A1* | 9/2014 | Martinez ............. H04L 41/5054 709/226 |
| 2014/0282938 A1* | 9/2014 | Moisa ................. G06F 21/6218 726/6 |
| 2014/0310175 A1* | 10/2014 | Coronel ............. G06Q 20/0453 705/44 |
| 2015/0170445 A1* | 6/2015 | Bajekal .................. G07B 15/00 340/5.61 |
| 2015/0244597 A1* | 8/2015 | Maes ...................... G06Q 10/10 715/736 |
| 2015/0271200 A1* | 9/2015 | Brady ................. H04L 63/1416 726/4 |
| 2016/0350160 A1 | 12/2016 | Hamway et al. |

OTHER PUBLICATIONS

"Convirture Solutions: Quota and User Management for Amazon Web Services," © Convirture 2013, <https://www.convirture.com/solutions_quota.php>, 1 page.

"Getting Started with Reserved Instances—Amazon Elastic Compute Cloud," AWS Documentation EC2 User Guide (API Version Feb. 1, 2014), <http://docs.aws.amazon.com/AWSEC2/latest/UserGuide/reserved-instances-fundamentals.html> [retrieved Apr. 1, 2014], 2 pages.

\* cited by examiner

HIDDEN COMPARTMENTS

CROSS REFERENCE TO RELATED APPLICATIONS

This application incorporates by reference for all purposes the full disclosure of co-pending U.S. patent application Ser. No. 14/295,129, filed concurrently herewith, entitled "COMPARTMENTS" and co-pending U.S. patent application Ser. No. 14/295,146, filed concurrently herewith, entitled "TECHNIQUES FOR PROVIDING COMPARTMENTS".

BACKGROUND

The use of network computing, storage, and other computing resources has proliferated in recent years. The resources for network computing and storage are often provided by computing resource service providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource service providers. The usage of network computing allows content providers and online merchants, among others, to efficiently and adaptively satisfy their computing needs, whereby the computing and storage resources used by the content providers and online merchants may be added or removed from a large pool provided by a computing resource service provider as needed and depending on their needs.

Consumers of computing resources hosted by a computing resource service provider (often referred to as "cloud services" consumed from a "cloud provider," respectively), may have accounts with the computing resource service provider for various purposes, such as to utilize computing resources to support a web page, to support computer science education and other education by enabling students to utilize computing resources provided by a computing resource service provider, to provide a streaming media site to millions of customers and thousands of employees as users of the account, and the like. For a single account of the computing resource service provider, multiple users may access the account to develop applications, utilize services and resources, design interfaces, and administrate the account. Usage of the account's resources may incur costs that may be billed to the owner of the account. Furthermore, when an account has multiple users, there is risk that some users may modify or delete important account resources, or incur excessive usage costs from their use of the account's resources. Conventional techniques for addressing such issues include requiring each user to create an individual user account; however this not only places a financial burden on the user (who, for instance, may lack a credit card or other form of payment), but does not allow the users to be governed by the policies of a controlling account.

BRIEF DESCRIPTION OF THE DRAWINGS

Various embodiments in accordance with the present disclosure will be described with reference to the drawings, in which.

DETAILED DESCRIPTION

Figure 1:
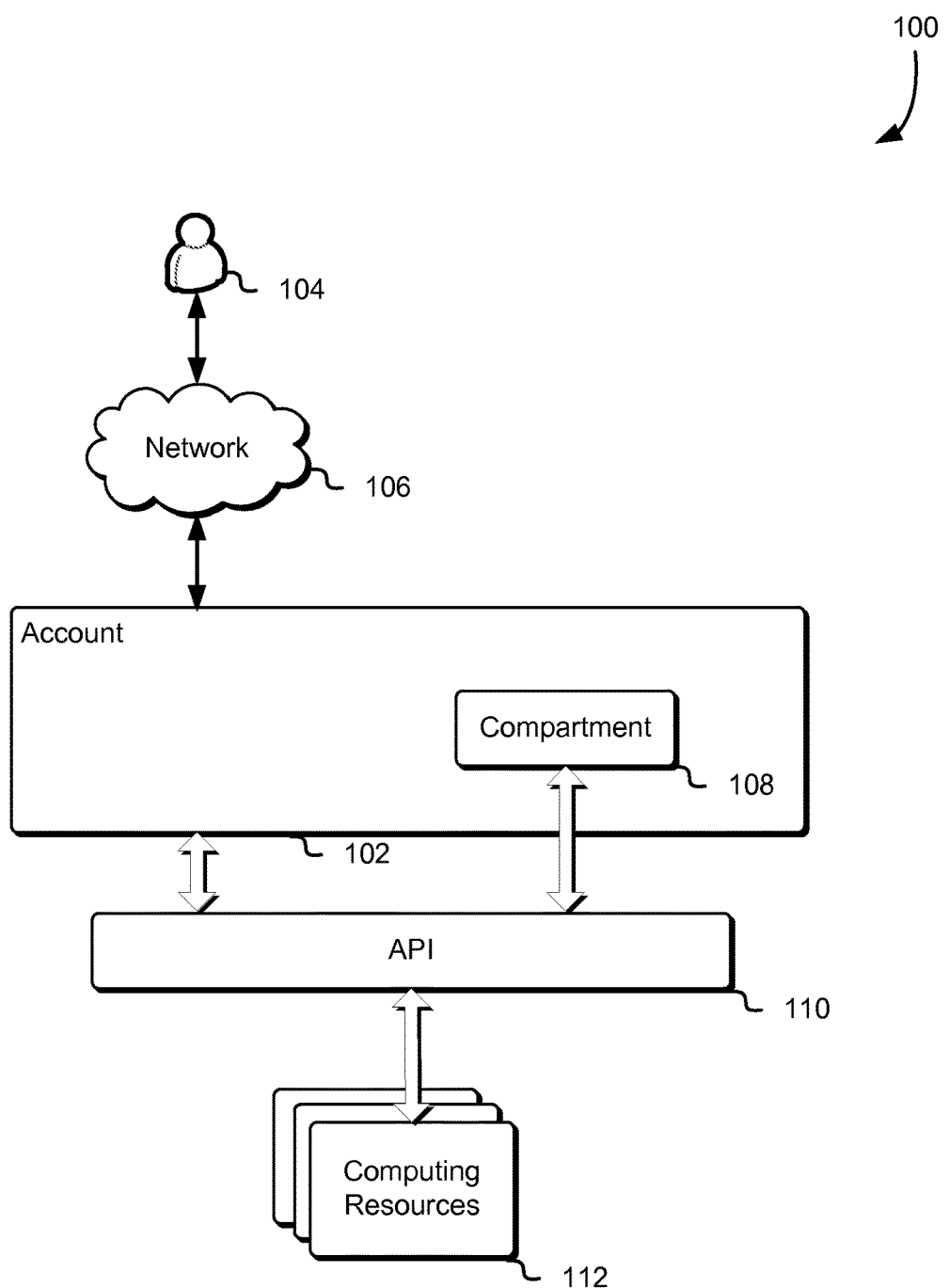
FIG. 1 illustrates an account having a compartment in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to web service containers (containers), defined herein as logical entities with an associated record structure, the record structure indicating that the container may grant, to one or more users, varying levels of access computing services and resources. One type of container is an account, which is a container for resources hosted by a computing resources service provider and further associated with billing information related to the agreement by the customer to pay for services, information about user credentials and access, and policies specifying the ownership and the scope of computing resources. Another type of container is a compartment, which bears many similarities to an account, such as being a container for resources hosted by computing resource service provider, and is described in more detail below.

The account may be created (e.g., set up and/or purchased) through completion of a web form that automatically configures the billing system, sets up the payment obligations, and creates a resource container with an account identity (ID). The account may support multiple users with unique identities recognized by the resources of the account. A user may be an individual, system, resource computing device, or other entity authorized to access to the account. Each user may have a unique name within the account and may present or otherwise prove the possession of security credentials, such as with a password, access key, and/or digital signature, to gain access to computing resources. Although an account may contain only one user, additional users may be added or removed from the account as needed.

Permissions defining what users may or may not do within an account may be assigned to users or groups of users according to policy documents or other encodings of policies assigned to the users or groups of users within the account. Each account has policies governing user access, but policies created in one account do not normally interact with policies in another account. Further, each account may have a number of roles; a role being an entity defining a set of permissions. Roles may not be attached to specific users or groups but may be assumed by trusted entities, such as a particular service, and multiple policies may be attached to each role.

Examples of roles include, but are not limited to, a trustee role and an administrator role. For example, a trustee having a trustee role may set policies restricting what can happen within an account or other container, however a trustee may not necessarily be able to fully administrate the account or container (e.g., to grant privileges within the account). Whereas an administrator having an administrator role may be able to fully administrate the account, and the trustee policy may state that the administrator role may not be removed. In some cases, the trustee may also have an administrator role and/or the administrator may have a trustee role.

An authorized user, (that is, an authenticated user having a role with sufficient privileges) may make requests to the web service to instantiate, that is, to create and provide resources such as a database resource and file storage. Commands and requests to the services may be performed by programmatic function calls to an API under the control of the web service account. Whether an entity is authorized to perform any particular action may be determined by an API call that includes a digital signature generated using a user credential of the entity. For example, a customer may use a private key to digitally sign a request to a service, whereupon the service forwards the digital signature and signed message to an authentication service that verifies the signature and responds with a credential (key) that the service may use to sign requests to the service or API that performs an action (such as, but not limited to, creating, deleting, and transferring compartments as described herein).

A compartment is a container having similarities to an account, but may be created to allow aspects of the account to detach and move into the compartment. In some embodiments, a compartment is an account with an additional association with a parent container (e.g., account or other compartment). In some examples, multiple compartments may be generated and enumerated within a single container. An API may allow an account user to create a compartment with a structure largely identical to the structure of an account (e.g., identical except for an additional association with the parent container), and which inherits aspects of the parent account. In at least one embodiment a service may create a compartment based on a request from a customer, contingent on authentication of the customer's credentials. A container hosting the compartment may have full access to the compartment and may be able to define the policies and permissions governing the compartment. By the container having full access, one or more identities of the container may be authorized to perform one or more administrative operations inside of the compartment. The ability to administer the account may correlate with the ability to administer the compartment so that, for instance, a user able to perform one or more operations in an account may also be able to perform those same operations in the compartment. In other examples, such a correlation may not be present, but permissions may be more specifically defined upon compartment creation.

Compartments provide certain advantages over an account. For example, once the purpose for which the compartment was created ends, the compartment may be terminated without negatively affecting the parent container and any resources within the compartment may subsequently be released without generating further usage cost to the owner of the parent account. Further, in some embodiments, a compartment may host one or more compartments within itself. Still further, a compartment may be created, configured, and, at some later period in time, transferred to a different account or the compartment may be converted to be a standalone account. Converting a compartment into a standalone account enables resellers to create, configure, and subsequently sell compartments to buyers as separate accounts. For example, an online marketplace seller could create a compartment with an installation of a software solution for a particular purpose and list the compartment on the marketplace as available for purchase, whereupon buyers would be able to purchase the compartment to use as their own account.

To create a compartment, the user may call a compartment creation API, which then creates a compartment, configures the parent-child relationship of the compartment, and configures one or more roles granting access (full or partial) to administer the compartment that may be assumable by the account in which the compartment resides. As noted, a user may be a service, and it one embodiment, the service may create a compartment by calling an API based on a pending customer request. Note that the API call may be performed by a user, a service, a console interface, or other process.

One example of this embodiment includes, but is not limited to, a situation where a customer makes a request to create a database, whereupon a database service may make the appropriate API calls to create a compartment to host a database; the determination of whether the database service may be permitted to create the compartment being based on the credentials (such as a digital signature and signed message) of the customer being verified by an authentication service. For example, the customer credentials may be presented to an authentication service, which, upon confirming authorization, may provide the database service with a token which may be held by the database service as proof that the database service is authorized to perform certain operations for the customer.

When an entity, such as a user, or service, makes an API call regarding one or more resources hosted within a container, the entity may pass its credentials, which includes the entity's ID and typically also passes the ID of the container in which any resources should be created. For example, if the container type passed is a compartment, rather than an account, it will pass the ID of the compartment. From the perspective of a service, a compartment container appears to be no different than an account container, except that that the security policies limits enforced on the parent account may not be exceeded by the child compartment.

In various embodiments, any account user authorized to assume a role or otherwise having permissions that allow the creation of a compartment may create a compartment and have the same rights to resources within the compartment as the user would have had to the same resources within the account, however the user may not necessarily have the ability to fully administrate the compartment. In addition, or in the alternative, variations are also considered as being within the scope of the present disclosure. For example, an account user who creates a compartment in a manner described herein may be granted rights to fully administrate the compartment by an account administrator or user with sufficient permissions to grant permissions to administrate the compartment. As another example, an account user who creates a compartment in a manner described herein may not be granted rights to administrate or access one or more applications, services, or computer resources hosted by the compartment. As yet another example, in some embodiments, only a user or service having full access to the parent container may create a compartment within the container. In some embodiments, only users or services with particular roles may create a compartment within the container. In some examples, any user of a container may create a compartment within that container, with users of the compartment having equal or lesser access to resources within the compartment as the user had to resources within the parent container.

In at least another embodiment, a compartment may inherit account-specific metadata from its parent container. For example, an account may be configured for a particular geographic region with a compartment for running a product in that region. In this example, the compartment may inherit metadata detailing tax information and requirements relevant to the particular region from the parent account. Hence, it may be that charges and costs incurred by the compartment and from resource usage within the compartment accrue (i.e., aggregate) to the parent container. Alternately, a compartment may be configured to have separate billing records such that charges and costs incurred by the compartment and from resource usage within the compartment accrue to a different responsible party than the party responsible for charges associated with the parent container.

In this manner, charges and other economic measurements related to resources in containers can be easily separated for the purpose of different tax treatments in different tax jurisdictions.

Tagging may be used to keep track of resource usage and billing within a compartment. A resource may be "tagged" with information (a tag) by creating, in a table or other data structure of a persistent data store, a relationship (association) between the information (e.g., an identity (ID) of a container) and the ID of a resource or particular type of resource. Because resource usage is also logged in a data store, the tag may be utilized in a query of one or more data stores to determine the usage associated with resources within a tagged container or associated with particular tagged resources within the container. For example, a compartment may have tagging enabled such that resources within the compartment may be tagged, such as with the compartment ID so that, as they are utilized resource usage is attributable to the compartment. Advantages of tagging compartments and resources may include providing an ability to segregate resource usage within the compartment from aggregated billing, usage reports and cost breakdowns in order to generate itemized billing invoices or resource use reports for particular compartments or for a specific project. In at least one embodiment, when a compartment and/or resource within the compartment is tagged, users and services within the compartment may not have visibility that the compartment or resource is tagged, but users and services within the parent container may have visibility that the compartment or resource within the compartment is tagged. In at least another embodiment, when a compartment and/or resource is tagged, users and services within the compartment may have visibility that the compartment or resource is tagged; for example, a properly authenticated call to an API to view an inventory of a container may return a list of child compartments and tagged compartments may have a mark indicating that the compartment is tagged, or an inventory of resources within a container may provide a list of the resources of the container and all child compartments with a mark next to each tagged resource identifying the compartment ID the resource is tagged with. In this manner, users of the compartment may be able to determine which resources are being separately tracked or billed to the compartment from other non-tagged resources. To users and services within a compartment who do not have visibility which compartment or resources are tagged, tagged resources may not be differentiated from non-tagged resources. As another embodiment usable in combination with other embodiments, resources within a compartment may be tagged independently from other resources within the compartment. As still another embodiment usable in combination with other embodiments, some resources within the compartment may be tagged and some resources within the compartment may not be tagged. Yet another embodiment usable in combination with other embodiments, some resources within the compartment may be tagged without tagging other resources within the compartment.

In at least another example, aggregated usage reports and cost breakdowns may be generated to view itemized billing or resource use of particular compartments, particular users or resources within a compartment, or particular groups of users within a compartment. In at least another embodiment, aggregated usage reports for one or more containers may be combined into an overall usage report of all resource usage within the one or more containers.

Relationships and roles configured by a parent container may propagate downward to the container, however relationships and roles configured within a compartment may not propagate upward to the parent container. For example, permissions, policies, and roles set within the compartment may not grant access to resources outside the compartment, but however, permissions, policies, and roles set within a parent container granting access to users or services within a compartment may do so. Note, however, that policy restrictions set within the compartment may take precedence over grants of access to resources even if granted within a parent container. Cross-compartment relationships may be managed in the same way as cross-account relationships may be managed (e.g., through roles, resource APELs, etc.) by the computing resource service provider, except that, in various embodiments, the compartment may have a distinct and separate namespace and policy scope than its parent account.

A container user who has one or more roles or permissions allowing the user to update administrative policies of the container may be granted the same permissions to a child compartment created within the container. In this case, the administrative policies of the compartment may be modifiable by administrators of the parent container as well as any user who has been delegated an administrative role under the parent container. Thus, the administrative users of the parent container may have the ability to modify the policies of the compartment, thereby permitting security policies of the compartment users to be managed by the administrative users of the parent containers; for example, account users with the ability to assign roles and permissions within the account may also assign roles and permissions to users within child compartments of that account. Although the roles, policies, and permissions of the users of the parent container may allow those users the same access to resources within the compartment as they would to resources within the parent container, the roles, policies, and permissions specified for compartment users may not necessarily grant access to resources of the parent container.

In at least one embodiment, fulfillment of an API call for a specific API may transfer ownership of a compartment to a different container. Normally, changing ownership of resources is costly and difficult to manage or automate; however, by using compartments, because of the way metadata about compartments and containers are kept, the ownership of all resources linked to the compartment may be changed by simply changing ownership of the compartment. Note that the API call may be performed by a user, a service, a console interface, or other process. In some embodiments, there may be an API for administration of a compartment, which may permit administrative users of the parent container to designate new administration permissions specific to the child compartment or replace the current administrators of the child compartment with the administrators of the container that is assuming ownership of the child compartment. In some examples, the transfer of permissions and roles may occur automatically with the change of ownership of a compartment. In at least another embodiment, the role permitting the original parent container to administrate the child compartment may not be altered. In other examples, the parent container may designate another container as having an administrative role over the child compartment, but the parent container may not relinquish ownership over the child compartment; for example, the owner of the parent container may authorize a third party support provider to have access to troubleshoot, update, or perform maintenance on to the resources within the child compartment, while still maintaining ownership over the child compartment. The authorization to grant the third party support provider the necessary access may be performed by an API call with a digitally signed user credential from the container owner or other authorized entity.

A computing resource service provider may allow customers to create compartments dynamically, as needed, or may allow customers to reserve a number of compartments the customer knows in advance will be needed. For instance, in exchange for a commitment to pay for a compartment for a long term (regardless of actual usage), the per-time-unit cost of the compartment may be lower. For instance, some computing resources (e.g., virtual computer systems, also referred to as instances) may be billed hourly at a certain rate per hour. For a one-year commitment to pay for the instance, the per-hour rate may be lowered. Similar billing structures may be configured for compartments, such as when resources in compartments have the ability to be utilized in accordance with a short-term on-demand model as well as with a longer term reservation model. Compartments created on demand may have different account billing structures than reserved compartments, and under certain conditions, it may be more cost effective to reserve compartments than to create compartments dynamically. In at least one embodiment, compartments may be reserved for a specified time (i.e., term). In at least another embodiment, when a term of a reserved compartment expires, the reserved compartment may be renewed for another term. In at least another embodiment, the term of a reserved compartment may be indefinite.

A compartment may also be designated as a hidden compartment; a hidden compartment being a compartment wherein at least some users of the parent compartment have restrictions on the ability to view, access, or administer the compartment or resources within the compartment. For example, a compartment for a legal department of a company may be created under the company account, with a requirement that no users outside the legal department, including administrators of the company account, may view data objects in that compartment. In such a case, users and administrators of the parent account may be restricted in their ability to view or access resources within the compartment. Other examples of hidden compartments include compartments created for secret projects and compartments containing protected information that should not be viewable by one or more users of parent container.

Yet another example of a hidden compartment may be a compartment, not visible to individual users, but rather created for use by a service, such as a database service. For example, if a user calls a database service from a container, the database service may call a hidden compartment API to create a separate hidden database resource compartment, if one does not already exist, within the user container, with database service having rights to administrate the hidden compartment. Note that the API call may be performed by a user, a service, a console interface, or other process. The database service may subsequently launch the requested instance within the database resource hidden compartment. In some examples, launching a database instance involves launching different resources using different services of the computing resource service provider, where the launched resources are collectively configured as the database instance. An advantage of the database resource hidden compartment is that billing for resource use within the database resource compartment may be calculated and/or billed against the database resource compartment separately from the parent container. In some cases, the usage of resources within a hidden compartment may be itemized within the billing invoice of the customer associated with the parent container. Alternately, the usage of resources within the hidden container may be aggregated with similar resource usage incurred outside of the hidden container; for example, database usage within a hidden container and separate database usage within the parent account or standard container within the parent account may be summed together as a single item on the customer invoice. In other cases, all resource usage within the hidden compartment is grouped together as a single item on the customer bill; for example, a database service and one or more virtual machine services all running within a hidden compartment incurring their own costs may be grouped together as a single cost for the hidden compartment on the customer invoice. In some instances, the customer associated with the parent container may receive a separate bill for the hidden compartment for costs incurred by the usage of resources within the hidden compartment. In other cases, such as where a customer is utilizing a compartment within an account of a vendor, resource usage incurred within a hidden compartment of the customer may be billed directly to the vendor by a computing resource service provider, and the vendor, in turn, may re-bill the customer.

In at least one embodiment a service may create the hidden compartment based on a request from a customer, pending authentication of the customer's credentials. For example, for a service or other entity to create a compartment in a customer's account, the service or other entity may be required to present cryptographic proof of a pending request by the customer whose fulfillment involves the creation of the compartment. In some examples, the service or other entity may submit a digital signature of a request by a customer to an authentication service that evaluates the digital signature. If the authentication service determines that the digital signature is valid, the authentication service may provide the service or other entity with a credential (e.g. cryptographic key) that the service or other entity can use to digitally sign a request to create the compartment and, in some examples, digitally sign requests to other services to provision resources inside of the compartment.

In at least one embodiment, a service that creates a hidden compartment may have an administrative role associated with the compartment. In at least another embodiment, the service that creates a hidden compartment assumes a particular role over the compartment, the particular role determined by a predetermined policy. Assumption of a role may involve submitting an API call to an identity management system of a computing resource service provider which, upon cryptographic verification of authorization to assume the role, provides a credential usable to digitally sign requests to perform administrative operations in connection with the compartment. Note that the API call may be performed by a user (via a user computing device), a service, a console interface navigated by a user, or in other ways. In some examples, fulfillment of a user request for a usage report or inventory of resources within a container includes providing an inventory of at least some of the hidden compartments within the container. In at least another embodiment, one or more hidden compartments may not appear within a usage report generated in response to an inventory request. Whether hidden compartments are identified in an inventory or usage report may be a configurable setting that a customer can, at least for some compartments, set themselves. In some examples, resources hosted within a hidden compartment may not appear within a usage report generated in response to an inventory request.

In another example, a customer on an online marketplace may select to purchase a digital product, such as a media product with attached digital rights management (DRM), and the digital product may be launched or placed in a new hidden compartment having controls on the customer's ability to execute, view, snapshot, print or alter the product. In at least one embodiment, the billing for the digital product may aggregate directly to the customer. In some examples, the billing aggregates to the marketplace provider, with the marketplace provider separately billing the customer.

Containers may also have quota limits assigned to measurable qualities associated with an account. For example, an account may have a quota setting a limit on the number of instantiations of a particular type of resource (e.g., virtual computer system) that may be created within the container. For example, an account may have a quota of 500 allowable virtual computer system instances (referred to simply as "instances") and the account may further have 500 users with the ability to create instances. In this example, if all of the users are members of the account and one or more of the users create more than one instance, the number of available instances in the quota may be prematurely exhausted. Therefore, an administrative user of the account may want to restrict the number of instances that individual users or groups of users may instantiate in order to ensure that the users do not exceed the quota or consume more than their share of instances. Just as with accounts, quotas may be separately assigned to one or more containers within an account.

The types of quotas within the scope of the present disclosure are not limited to instantiations of certain types of resources. In at least one embodiment, quotas may be used to set limits on the amount of time that individual users or groups of users may spend logged into the container. In at least another example, quotas may be used to limit the cost incurred by an individual user or group of users of the container. In another example embodiment, quotas may be used to limit the number of users or groups a container may have. In at least another example, quotas may be used to limit the number of users that may be logged into a container at one time. In at least another example, quotas may be used to limit the number of files that may be within a container. As another example, quotas may be used to limit the number of files that may be within a particular directory or all directories within a container. Quotas may also be used to limit the file size of files within a container or a particular directory or all directories within a container. In at least another embodiment, quotas may be used to limit the number of text/instant messages provided through the container by a user or group of users the network bandwidth used by a container, user, or group of users the amount of data that may be uploaded or downloaded to a container or by a user or group of users and the like. In other examples, quotas may be used to limit the amount of storage space usable by a container, the number of databases within a container, the size of databases within a container, the number or size of tables within databases within a container the amount of virtual memory usable by a container, user, or group of users, the number of active threads or active processes within a container, the number of invalid logon attempts to the container by a user or group of users, the number of database queries a user or group of users may make within the container in a given time period, the number of snapshots that may be made of a container, and/or the number of simultaneous connections to a database.

In at least another embodiment, quotas may be used to limit the number of compartments that may reside within a container, the number of certain types of compartments that may reside within a container; for example, configuring quota for a container to have a limit of possible five compartments hosting databases, ten compartments for virtual machines, etc. In at least another example, quota limits may be set on the number of containers created by a particular type of user (e.g., individual, service, etc.); for example, a quota may be set to limit database resources running within a container to only create up to four compartments.

The aggregated quota limit of a particular measurable quantity for a parent container and all of its children is considered as a quota pool. Quotas may be further assigned to compartments within the container, as long as the aggregation of the consumed portions of the quotas of the container and its child compartments do not exceed the quota pool. The quotas limits assigned by administrators of a container to child compartments of the container may be considered quota aggregation groups.

Quota aggregation groups may be utilized to ensure that the resources of an account are not prematurely exhausted or exceeded. For example, a quota aggregation group may be created within a compartment with limits reflecting a subset of the parent container's quota pool. An administrative user may then assign users to the compartment, with the users limited according to the assigned quota aggregation group. In this example, the assigned users may be limited in the number of instances they can create within the compartment. Thus, by creating a compartment for each user or group of users and assigning a quota aggregation group to the compartment, the administrative user may ensure that the quota of the parent container is not prematurely or unnecessarily depleted. In the example of the account with 500 allowable instances and 500 users, the administrative user may create a compartment having a quota aggregation group for each user, assigning a quota limit of one instance to each quota aggregation group. In an alternate embodiment, child compartments may have quotas independent of and not limited by the quota pool of the parent container.

In at least one embodiment, when a compartment is transformed into a standalone account, the quota limits do not follow the standalone account and the quota limits aggregate back to the quota pool of the parent container. In at least another embodiment, when a compartment is transformed into a standalone account, the quota limits follow the standalone account and the quota limits do not aggregate back to the quota pool. In at least another embodiment, when a compartment is transformed into a standalone account, the quota limits follow the standalone account, but, as well, the quota limits may be aggregated to the quota pool of the parent container. Likewise, in at least another embodiment, when a compartment is deleted, the quota limits assigned to the quota aggregation groups of the deleted compartment may aggregate back to the quota pool of the parent container. In at least another embodiment, when a compartment is deleted, the quota limits assigned to the quota aggregation groups of the deleted compartment may not aggregate back to the quota pool of the parent container. In some embodiments, the effect of compartment transformation on quota limits is programmatically configurable and/or context dependent.

A quota aggregation group of a compartment may be considered as a quota pool by child containers of the parent container. In at least one embodiment, where a compartment with a quota limit assigned to a quota aggregation group is transferred to be the child of another compartment having an equal or larger quota limit assigned to its own quota aggregation group, the quota pool of the original parent container increases by the limit specified by the quota aggregation group of the transferred compartment, while the limit assigned to the quota aggregation group of the other compartment is deducted by the limit specified by the quota aggregation group of the transferred compartment. In some examples, where a compartment with a quota limit assigned to a quota aggregation group is transferred to be the child of another compartment having a smaller quota limit assigned to its own quota aggregation group, the quota pool of the original parent container increases by the limit specified by the quota aggregation group of the other compartment, the limit assigned to the quota aggregation group of the transferred compartment is configured to equal the limit assigned to the quota aggregation group of the other compartment, and the limit assigned to the quota aggregation group of the other compartment is depleted. In some embodiments, a compartment having a larger quota limit assigned to its quota aggregation group than that allowed by the quota aggregation group of another compartment may not be transferred to be under the ownership of that other compartment. In other embodiments, the quota pool of the original parent container and the quota aggregation group of the other compartment are not affected by the quota limits of the transferred compartment.

In at least one embodiment, quota limits assigned to quota aggregation groups may deducted from the quota pool of the parent container. In this embodiment, for example, a container having two child compartments may have a quota pool creation limit of 100 instances. The administrative user of the container may assign a 75 instance limit to a quota aggregation group of the first child compartment, meaning that a maximum of 25 instances may be assigned to a quota aggregation group of the second child compartment. In such a case, if the 75 instance limit is assigned to the quota aggregation group of the first compartment and a 25 instance limit is assigned to the quota aggregation group of the second compartment, the parent container may not create any instances of its own because all instance limits of its quota pool have been allocated. In some embodiments, quota limits assigned to quota aggregation groups may not be deducted from the parent container, but may be tracked to ensure that the overall quota pool is not exceeded. In such examples, using the above example of the container having two child compartments and a quota pool creation limit of 100 instances, the administrative user may assign a 75 instance limit to a quota aggregation group of the first child compartment and a 50 instance limit to a quota aggregation group of the second child compartment, retaining a quota pool creation limit of 100 instances. In this embodiment, quota limits cumulatively exceeding the quota pool may be assigned, but the quota pool may still limit the aggregated instance usage; that is, allocation of computing resources belonging to the account may impact the quotas assigned to a compartment. For example, if the first child compartment creates its limit of 75 instances, the parent container and the second child compartment may cumulatively only create a maximum of 25 instances, even though the second child container has a limit of 50 instances assigned to its quota aggregation group, because the quota pool of the account limits the total number of instances created to 100. In some examples, the quota aggregation group of a compartment may be adjusted based on whether computing resources of the account are allocated independently from (i.e., outside) the compartment. In at least another embodiment, certain users of a compartment may assign quota limits on a quota aggregation group of the compartment as long as the quota limits do not exceed the quota pool of the parent container.

A computing resource service provider may allow customers to create instances dynamically, as needed, within a container, or may allow customers to reserve a number of instances the customer knows in advance will be needed. Instances (i.e., virtual computer systems) created on demand may have different account billing structures than long-term commitment instances, and under certain conditions, it may be more cost effective to reserve instances than to generate instances dynamically. In at least one embodiment, instances may be reserved for a specified time (i.e., term), where the term may be longer than a standard term for on-demand instances. For example, a customer may commit to a term of one year where on-demand instances may have a standard unit of billing of one hour. In exchange for the commitment, the customer may receive a lower per-hour price for use of the instance. In at least another embodiment, when a term of a long-term commitment instance expires, the long-term commitment instance may be renewed for another term. In at least another embodiment, the term of a long-term commitment instance may be indefinite.

In at least one embodiment, instances may be reserved for specific compartments. Long-term commitment instances for compartments may have a different billing structure than long-term commitment instances for accounts. In some embodiments, long-term commitment instances may be tagged for use only by compartments. In other embodiments, instances reserved for a parent container may be transferred to a child compartment. In this embodiment, for example, an account customer who has reserved a number of instances for an account may choose to assign a number of the long-term commitment instances to a compartment to take advantage of a more favorable billing structure.

A service may utilize available long-term commitment instances of the parent account for creating instances within compartments. For example, a database service may create a hidden compartment within an account and launch an instance within the hidden compartment as described herein. In this example, if the account has a number of long-term commitment instances, the database service may assign the long-term commitment instance to the hidden compartment and utilize the long-term commitment instance within the hidden compartment. In at least another embodiment, deleting the compartment may make the long-term commitment instances within the compartment available to the parent container. In at least another embodiment, deleting the compartment may delete any long-term commitment instances within the compartment.

In some embodiments, when compartment ownership is transferred to a different container, the long-term commitment instances within the compartment revert back to the original parent container. In other embodiments, when compartment ownership is transferred to a different container, the long-term commitment instances within the compartment remain with the compartment and do not revert back to the original parent.

An online marketplace may be configured to utilize compartments to support the buying and selling of computing resource stacks. A computing resource stack includes one or more computing resources that may be interrelated and bundled into a single package. A computing resource stack, when provisioned, may comprise multiple computing resources, perhaps from different services of the computing resource service provider. The computing resources of the stack may be collectively configured to operate as a collective unit. For example, a computing resource stack, when provisioned, may include a virtual computer system that is configured to store and read data from a virtual storage device (e.g., virtual block-level storage device) as well as access and/or write data to a specified logical data container of a data storage service. Thus, a provisioned computing resource stack may comprise computing resources where the computing resources are further configured to interoperate with one another. Therefore, a computing resource stack may comprise one or more compartments, such that an account user may create and configure a compartment, and then offer that preconfigured compartment for sale on an online marketplace.

An example of creating and configuring a compartment for sale on an online marketplace includes, but is not limited to, a situation where the user may create a compartment within the parent account (i.e., a computing resource stack provider account), instantiate one or more resources within the compartment, such as instantiating a database resource, file storage, and a point of sale application interface, configuring the one or more resources as desired, and then offer the compartment for sale to the public on an online marketplace.

In at least one embodiment, the account user may want to prevent the buyer of the compartment from having the ability to view and/or make snapshots of the one or more configured resources instantiated within the compartment. For example, virtual computer systems in the compartment may be configured with executable code that is proprietary to the vendor of the compartment. In this embodiment, the account user may create a hidden compartment instead of a standard compartment, or convert a standard compartment into a hidden compartment, and configure the user policy for buyers of the compartment to restrict visibility to and ability to snapshot resources instantiated within the hidden compartment.

The effect of acquisition of a compartment by one entity from another entity may vary in accordance with various embodiments. For example, when a compartment is purchased or otherwise acquired by a buyer, the compartment may be transformed into an account, and account billing services may be configured to indicate that the buyer will be responsible for future costs incurred by the purchased container. As another example, when a compartment is purchased by a buyer, a new account may be created for the buyer and the compartment may be transferred to the created account. In at least another embodiment, when a compartment is purchased by a buyer who already has an account, the compartment may be transferred to the buyer's account. In some examples, the compartment may remain a compartment under the customer (i.e., vendor) account, but the account billing services may be configured to indicate that the buyer will be responsible for future costs incurred by the purchased compartment. In at least another embodiment, the compartment may be transformed into an account, but the parent container retains permissions sufficient for one or more users of the parent container to maintain and upgrade the purchased container as desired.

In other examples, the compartment may remain a compartment under the vendor account, and the vendor may still manage the compartment and bill the buyer for usage costs. In at least one alternate example, the buyer may lease a compartment from the vendor under a leasing arrangement (i.e., an arrangement where a customer pays for use of the compartment based on an amount of time, which may have a set term, which may auto-renew). In the latter case, the vendor may retain permissions to delete, transfer or deactivate the compartment in the event that the lease ends or the lessee stops paying on the lease.

In at least another embodiment, a marketplace provider, such as a computing resource service provider, may allow vendors to host compartments for sale within a marketplace compartment. In this and other embodiments, the act of the vendor adding the compartment to an online marketplace may automatically cause the compartment to transfer to the computing resource service provider. Upon purchase of the compartment by a buyer, in at least this embodiment, the purchased compartment may then be transferred from the computing resource service provider to an account of the buyer or the compartment may be converted into an account of the buyer. Furthermore in this case, the marketplace provider may be responsible for structuring the billing arrangements between buyers and lessees of the compartments in the marketplace. Another variation of this embodiment may be that, rather than transferring the compartment to the marketplace provider, a vendor can sell a compartment to the marketplace provider and the marketplace provider hosts the compartment for resale.

In at least one embodiment, the computer resource service provider may manage the pool of unsold inventory. In one example of this embodiment, the computer resource service provider may create one or more compartments on demand after purchase by the buyer. In another example of this embodiment, the computer resource service provider may host a limited pool of inventory, so as to minimize the consumption of resources, and create new compartments only when the inventory falls below a certain threshold.

A compartment may be listed for sale on an online marketplace in response to one or more API calls. The API call may have one or more associated parameters that enable or disable various attributes associated with the compartment for sale as described herein. Examples of API parameters include, but are not limited to, a parameter for specifying whether a vendor may be able to delete a compartment after it is sold (e.g., if the compartment is provided to the purchaser under a leasing agreement) and a parameter specifying whether the vendor may administrate the compartment even if the compartment is transferred to a buyer's account (e.g., if the vendor is responsible for maintaining, troubleshooting, and upgrading instances within the compartment).

In some embodiments, the compartment may be initially instantiated under one customer account, and later that customer account may initiate the request to reassign ownership and billing responsibility for the compartment to another customer account; i.e., a request to dissociate the purchased container from the parent container customer and associate the purchased container with another customer. An example of these embodiments include, but are not limited to, a consultant who may be hired by a customer to instantiate and configure an instance within a compartment inside an account of the consultant, whereupon after completion the compartment is then moved to an account of the customer. In other embodiments, the request to reassign ownership and billing responsibility may be performed by an automated process initiated by one or more actions of the buyer, such as by clicking through a web marketplace interface.

Furthermore, in some examples, an online marketplace system for compartments may be configured to notify the seller when the inventory of a particular compartment is sold out. In at least one embodiment, the seller may be further notified when inventory stocks of a particular compartment drop below a threshold quantity. In at least another embodiment, the seller may be notified when a consumer rates or reviews a product. In at least another embodiment, the seller may add responses to reviews of its products.

In at least one embodiment, a seller may configure each compartment as desired before posting the compartment for sale. In at least another embodiment, the seller creates a snapshot of a compartment after configuration and may create a fully-configured new compartment by instantiating a virtual machine from the snapshot. In at least another embodiment, the purchase of a compartment on an online marketplace may automatically create a new compartment by instantiating a virtual machine from the snapshot and/or provisioning other resources of the compartment. In this embodiment, the inventory may never sell out unless the seller chooses to stop selling the compartment or chooses to put a limit on the number of compartments that may be purchased or purchased over a period of time (e.g., such as five compartments per day).

Compartments may incur costs for the account owner because they may be allocated resources for which the computer services provider may bill. An account owner selling compartments in a marketplace may wish to mitigate costs incurred by compartments available for purchase while they are idle and unsold. In at least one embodiment, the account owner may make a snapshot of the configured compartment, deleting the compartment, and offering the snapshot of the compartment for sale on the marketplace. In this embodiment, the only costs incurred by an unsold compartment may be the storage costs associated with storing the snapshot. In at least another embodiment, the computer services provider may have a different billing structure for compartments while they are idle and unsold.

When a compartment is created within the account, it may utilize a collection of computing resources reserved by the account owner. In other examples, when the compartment is sold, the compartment may be transferred to a different collection of computing resources allocated to the buyer, and the computing resources reserved by the account owner may be freed for creation of another compartment or for other use by the account owner. In another example, the buyer may be further presented with computer resource purchasing options for hosting the compartment. In still another example, the computing resource service provider may further bill the buyer for the collection of computing resources for hosting the purchased compartment. In an alternate embodiment, the computing resource service provider may bill the account owner for the collection of computing resources for hosting the compartment, and the account owner may bill the buyer for the collection of computing resources.

In at least another embodiment, after purchase by a buyer, the compartment may continue to occupy the computing resources originally reserved by the account owner, and the account owner may be allocated different but equivalent computing resources for creation of another compartment or for other use by the account owner. In at least one embodiment, when one or more compartments are purchased by a buyer, the one or compartments may be instantiated for users within the account of the buyer, wherein the purchased one or more compartments may be administrated by one or more services, such as a database resource, and the buyer may not have one or more permissions to the one or more compartments compartment (such as view or administrative permissions).

A computing resource service provider may host various computing systems that consist of distributed sets of a plurality of components, subsystems and resources and may further include, but not be limited to, virtualized and/or non-virtualized components, subsystems and resources. In such distributed and/or virtualized systems, the plurality of components, subsystems and/or computer resources may consist of a collection of one or more instances of a number of different types and configurations of resources. Such resources may include, but not be limited to, load balancers, scaling groups, computing systems, database systems, database storage, block storage systems, block storage, data domains, system properties and/or other such computer system resources.

A computing resource stack may further comprise one or more descriptions of the set of resource instances (referred to herein as stacks), which may include information about the resource elements associated with the computing system, such as the type, number, configuration, metadata and/or other such information describing the associated resource instances. Further information about stacks and instantiating a stack may be found in co-pending U.S. patent application Ser. No. 14/228,119, entitled "PARALLEL ASYNCHRONOUS STACK OPERATIONS", and co-pending U.S. patent application Ser. No. 14/036,700, entitled "CANCEL AND ROLLBACK UPDATE STACK REQUESTS", which are hereby incorporated herein by reference in their entirety. A stack may be described using one or more templates, which may include lists of resources and parameters associated with those resources such as the required number and types of resource instances, the resource instances and parameters including systems, system parameters, system configurations, software, hardware, virtual machines, storage, network resources and/or other such resources that may be used by the stack instantiation. A stack may further specify creation, configuration, and use of one or more of standard and hidden compartments, one or more quotas for one or more compartments, and one or more long-term commitment instances to assign to one or more compartments. In at least one embodiment, such stacks and/or templates may be listed for sale on an online marketplace. An advantage of buying and selling stacks in an online marketplace for instantiation within compartments is that, until the stack is purchased, it may be more cost efficient for the seller to only incur the cost of storage for the stack while the stack is in available inventory rather than incurring the cost of having an unsold compartment being hosted by a computer resource provider.

In an online marketplace enabled to sell stacks, a marketplace buyer may purchase a stack listed on a marketplace to be instantiated into one or more compartments within an account of the buyer. In one example, the buyer may already have one or more existing compartments available for the stack to be instantiated into. In another example, completing the purchase transaction may cause one or more compartments to be created for the stack to be instantiated into. In yet another example, an entity of the seller account may assume a trustee role and/or administrator role of one or more compartments of the buyer, and the seller instantiates the stack within the one or more compartments. Note that assuming a role may comprise modifying an existing role to include permissions sufficient for an entity acting in the role to perform the actions required by the role being assumed; i.e., an existing role for a container may assume an administrator role by being modified to allow entities having that role to fully administer the relevant container. As another example, the computer resource provider may assume the role of trustee and/or administrator for one or more compartments of the buyer, and the computer resource provider instantiates the stack within the one or more compartments. In a different example, one or more compartments may be created with a parent container of the seller account and the stack may be instantiated within the one or more compartments, with the buyer accessing the stack through the parent container. In this embodiment, the seller may supply the billing services for billing the costs incurred by the instantiation of the stack to the buyer, rather than the computer resource provider. In one example, when one or more stacks are purchased by a buyer for instantiation into a compartment, the instantiated one or more compartments may be administrated by one or more resources, such as a database resource, and the buyer may not have one or more permissions to the one or more compartments compartment (such as view or administrative permissions). In another example, the inventory for a particular stack may be unlimited. In another example, the seller may be able to restrict available inventory of stacks. In yet another example, the seller may be able to make stacks available for a limited time, such as for a sale.

Furthermore, an online marketplace for compartments may be configured to notify the seller when the inventory of a particular stack is sold out. In one example, the seller may be further notified when inventory stocks of a particular stack drop below a threshold quantity. In another example, the seller may be notified when a consumer rates or reviews a stack. As yet another example, the seller may add responses to reviews of its stacks. In at least one embodiment, the computer resource service provider may manage the pool of unsold inventory. In one example of this embodiment, the computer resource service provider may, after the purchase of a stack by a buyer, create one or more compartments on demand and instantiate the stack within the compartment. In another example of this embodiment, the computer resource service provider may host a limited pool of compartments with instantiated stacks, so as to minimize the consumption of resources, and instantiate new stacks and compartments only when the inventory falls below a certain threshold.

Figure 2:
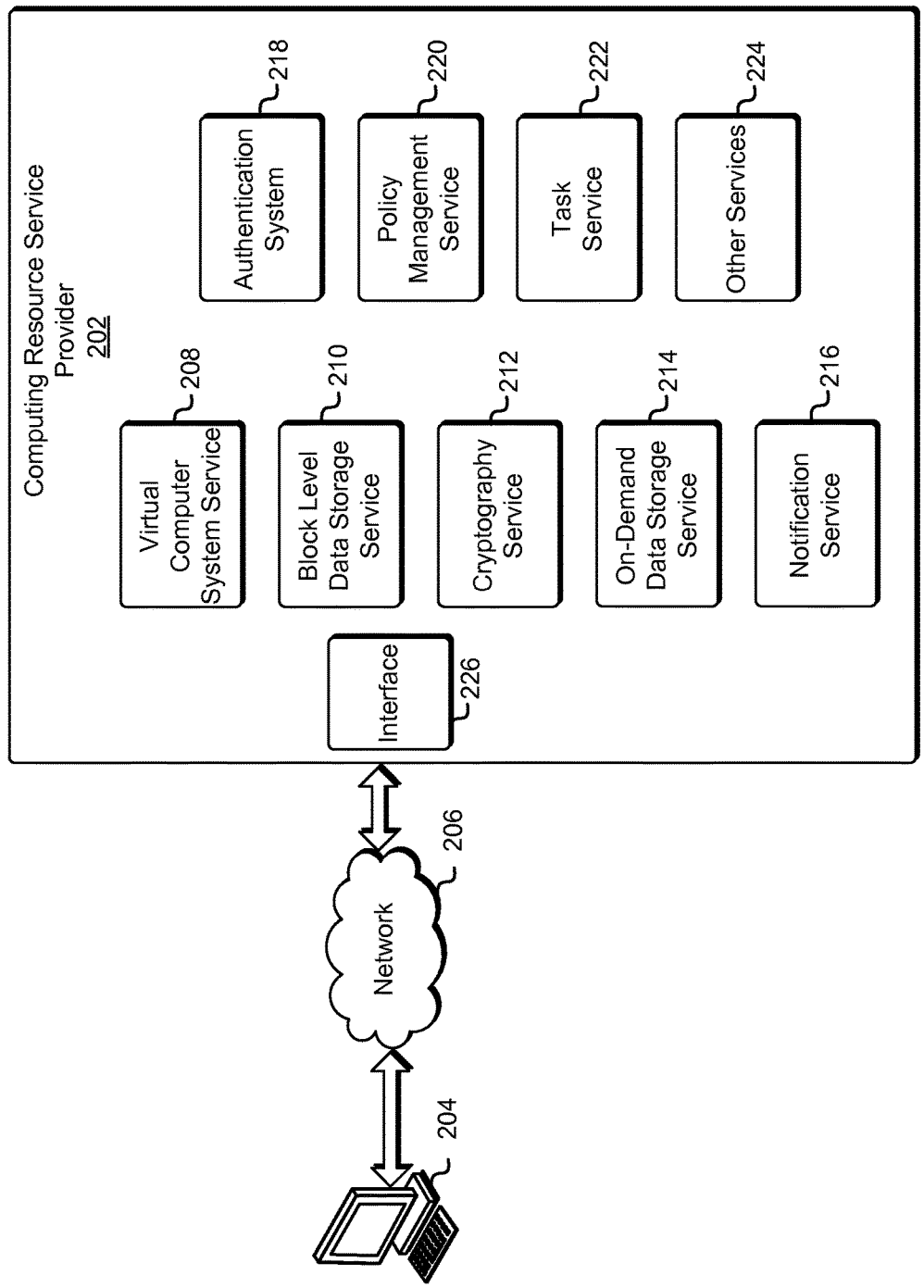
FIG. 2 illustrates a customer connected to a computing resource service provider in accordance with at least one embodiment.

FIG. 1 illustrates an aspect of an environment 100 in which an embodiment of the present disclosure may be practiced. The environment 100 illustrated in FIG. 1 may be the same environment as illustrated in FIG. 2, below. As illustrated in FIG. 1, the environment 100 may include an account 102, which a user 104 accesses through a network 106. The account 102 may be, for instance, a customer account of multiple customer accounts managed by the computing resource service provider discussed below in connection with FIG. 1. The account 102 structure includes the resources available to authorized users of the account 102, as well as the account 102 owner, and may further comprise one or more compartments 108, through which, like the account 102, the one or more compartments 108 may call an API 110 to access or instantiate computing resources 112. Whether users and services are authorized to perform requested operations on other resources within the account 102 may be determined by one or more policies defining levels of access held by the users or services. Users and services may hold one or more roles within the account 102, and policies may be applied to individual users or may be applied to a role as a whole. The role of administrator may provide full access to all resources of the account 102, and each account 102 may have one or more users having the administrator role. Whether a user or service is authorized to perform any particular action may be determined by an API call that includes a digital signature generated using a user credential (e.g., secret cryptographic key). In one example, the account 102 may be an account 102 accessible remotely through the network 106 by the user 104. In another example, the account 102 may be accessible remotely through a network 106 or locally on the same computing device by a computing resource.

The network 106 represents the path of communication between the user 104 and the account 102. Examples of the network 106 include, but are not limited to, the Internet, a local area network, a wide area network and Wi-Fi. The one or more compartments 108 may be defined by one or more records with a similar structure to one or more records associated with the account 102, and the one or more compartments 108 may be a child entity of either the account 102 or another compartment 108 (parent container). In at least one embodiment, compartments may be nested within other compartments. In at least another embodiment, there may be a limit to the level of nesting. As another embodiment that may be combined with various embodiments, the level of nesting may be limited to one so that, for instance, a compartment can be created within an account, but not within another compartment.

From the perspective of an API 110, which may be an API of a particular sub-system (e.g., service) discussed below in connection with FIG. 2, the one or more compartments 108 may be virtually identical from an account 102, other than a record indicating that the structure may be of a container type rather than an account type. The one or more compartments 108 may also have at least one record field indicating the parent container of the one or more compartments 108. Like an account 102, the one or more compartments 108 may have users associated with the one or more compartments 108. Like an account 102, whether users and services are authorized to perform requested operations on other resources within the one or more compartments 108 may be determined by one or more policies defining levels of access held by the users or services. Whether a user or service is authorized to perform any particular action may be determined by an API call that includes a digital signature generated using a user credential (e.g., secret cryptographic key). Users and services may hold one or more roles within the one or more compartments 108, and policies may be applied to individual users or may be applied to a role as a whole. The role of trustee may have full or partial administrative access to some or all resources of the one or more compartments 108, and each compartment 108 may have one or more users having the trustee role. Account 102 and compartment 108 records may be stored in one or more databases, and an identity access services may manage the roles and policies of the assigned users and services. In one example, the users associated with the one or more compartments 108 may not necessarily be associated with the parent container other than indirectly through the association of the compartment with the parent. In another example, trustees of the parent container may also be trustees of the one or more compartments 108. In yet another example, the parent container may be a trustee of the one or more compartments 108.

The API 110 represents a library of functions or routines that may be called to perform specific operations that interact with, generate, or operate on computing resources 112. The API may be a web service API. Examples of computing resources 112 include virtual machines, databases, files, and example operations causable through the submission of API calls include, but are not limited to, operations that create instances of virtual computer system services and on-demand data storage services, block level storage services, archival data storage services and database services.

FIG. 2 shows an example of a customer connected to a computing resource service provider in accordance with at least one embodiment. The computing resource service provider 202 may provide a variety of services to the customer 204 and the customer 204 may communicate with the computing resource service provider 202 via an interface 226, which may be a web services interface or any other type of customer interface. While FIG. 2 shows one interface 226 for the services of the computing resource service provider 202, each service may have its own interface and, generally, subsets of the services may have corresponding interfaces in addition to or as an alternative to the interface 226. The customer 204 may be an organization that may utilize one or more of the services provided by the computing resource service provider 202 to maintain and deliver information to its employees, which may be located in various geographical locations. Additionally, the customer 204 may be an individual that utilizes the services of the computing resource service provider 202 to deliver content to a working group located remotely. As shown in FIG. 2, the customer 204 may communicate with the computing resource service provider 202 through a network 206, whereby the network 206 may be a communication network, such as the Internet, an intranet or an Internet service provider (ISP) network. Some communications from the customer 204 to the computing resource service provider 202 may cause the computing resource service provider 202 to operate in accordance with one or more embodiments described herein or a variation thereof.

The computing resource service provider 202 may provide various computing resource services to its customers. The services provided by the computing resource service provider 202, in this example, include a virtual computer system service 208, a block-level data storage service 210, a cryptography service 212, an on-demand data storage service 214, a notification service 216, an authentication system 218, a policy management service 220, a task service 222 and one or more other services 224. It is noted that not all embodiments described herein include the services 208-224 described with reference to FIG. 2 and additional services may be provided in addition to or as an alternative to services explicitly described herein. As described herein, each of the services 208-224 may include one or more web service interfaces that enable the customer 204 to submit appropriately configured API calls to the various services through web service requests. In addition, each of the services may include one or more service interfaces that enable the services to access each other (e.g., to enable a virtual computer system of the virtual computer system service 208 to store data in or retrieve data from the on-demand data storage service 214 and/or to access one or more block-level data storage devices provided by the block level data storage service 210).

The virtual computer system service 208 may be a collection of computing resources configured to instantiate virtual machine instances on behalf of the customer 204. The customer 204 may interact with the virtual computer system service 208 (via appropriately configured and authenticated API calls) to provision and operate virtual computer systems that may be instantiated on physical computing devices hosted and operated by the computing resource service provider 202. The virtual computer systems may be used for various purposes, such as to operate as servers supporting a website, to operate business applications or, generally, to serve as computing power for the customer. Other applications for the virtual computer systems may be to support database applications, electronic commerce applications, business applications and/or other applications. Although the virtual computer system service 208 may be shown in FIG. 2, any other computer system or computer system service may be utilized in the computing resource service provider 202, such as a computer system or computer system service that does not employ virtualization or instantiation and instead provisions computing resources on dedicated or shared computers/servers and/or other physical devices.

The block-level data storage service 210 may comprise one or more computing resources that collectively operate to store data for a customer 204 using block-level storage devices (and/or virtualizations thereof). The block-level storage devices of the block-level data storage service 210 may, for instance, be operationally attached to virtual computer systems provided by the virtual computer system service 208 to serve as logical units (e.g., virtual drives) for the computer systems. A block-level storage device may enable the persistent storage of data used/generated by a corresponding virtual computer system where the virtual computer system service 208 may only provide ephemeral data storage.

The computing resource service provider 202 also includes a cryptography service 212. The cryptography service 212 may utilize one or more storage services of the computing resource service provider 202 to store keys of the customers in encrypted form, whereby the keys may be usable to decrypt customer 212 keys accessible only to particular devices of the cryptography service 212.

The computing resource service provider 202 further includes an on-demand data storage service 214. The on-demand data storage service 214 may be a collection of computing resources configured to synchronously process requests to store and/or access data. The on-demand data storage service 214 may operate using computing resources (e.g., databases) that enable the on-demand data storage service 214 to locate and retrieve data quickly, so as to allow data to be provided in responses to requests for the data. For example, the on-demand data storage service 214 may maintain stored data in a manner such that, when a request for a data object is retrieved, the data object can be provided (or streaming of the data object can be initiated) in a response to the request. As noted, data stored in the on-demand data storage service 214 may be organized into data objects. The data objects may have arbitrary sizes except, perhaps, for certain constraints on size. Thus, the on-demand data storage service 214 may store numerous data objects of varying sizes. The on-demand data storage service 214 may operate as a key value store that associates data objects with identifiers of the data objects which may be used by the customer 204 to retrieve or perform other operations in connection with the data objects stored by the on-demand data storage service 214.

In the environment illustrated in FIG. 2, a notification service 216 may be included. The notification service 216 may comprise a collection of computing resources collectively configured to provide a web service or other interface and browser-based management console. The management console can be used to configure topics for which customers seek to be notified of, configure applications (or people), subscribe clients to the topics, publish messages, or configure delivery of the messages over clients' protocol of choice (i.e., hypertext transfer protocol (HTTP), e-mail and short message service (SMS), among others). The notification service 216 may provide notifications to clients using a "push" mechanism without the need to periodically check or "poll" for new information and updates. The notification service 216 may further be used for various purposes such as monitoring applications executing in the virtual computer system service 208, workflow systems, time-sensitive information updates, mobile applications, and many others.

As illustrated in FIG. 2, the computing resource service provider 202, in various embodiments, includes an authentication system 218 and a policy management service 220. The authentication system 218, in an embodiment, may be a computer system (i.e., collection of computing resources) configured to perform operations involved in authentication of users of the customer. For instance, one of the services 208-216 and 220-224 may provide information from a user to the authentication service 218 to receive information in return that indicates whether or not the user requests are authentic.

The policy management service 220, in an embodiment, may be a computer system configured to manage policies on behalf of customers (such as customer 204) of the computing resource service provider 202. The policy management service 220 may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 202, in various embodiments, may also be equipped with a task service 222. The task service 222 may be configured to receive a task package from the customer 204 and enable executing tasks as dictated by the task package. The task service 222 may be configured to use any resource of the computing resource service provider 202, such as one or more instantiated virtual machines or virtual hosts, for executing the task. The task service 224 may configure the one or more instantiated virtual machines or virtual hosts to operate using a selected operating system and/or a selected execution application in accordance with a requirement of the customer 204.

The computing resource service provider 202 additionally maintains one or more other services 224 based at least in part on the needs of its customers 204. For instance, the computing resource service provider 202 may maintain a database service for its customers 204. A database service may be a collection of computing resources that collectively operate to run one or more databases for one or more customers 204. The customer 204 may operate and manage a database from the database service by utilizing appropriately configured API calls. This, in turn, may allow a customer 204 to maintain and potentially scale the operations in the database. Other services include, but are not limited to, object-level archival data storage services, services that manage and/or monitor other services and/or other services.

Figure 3:
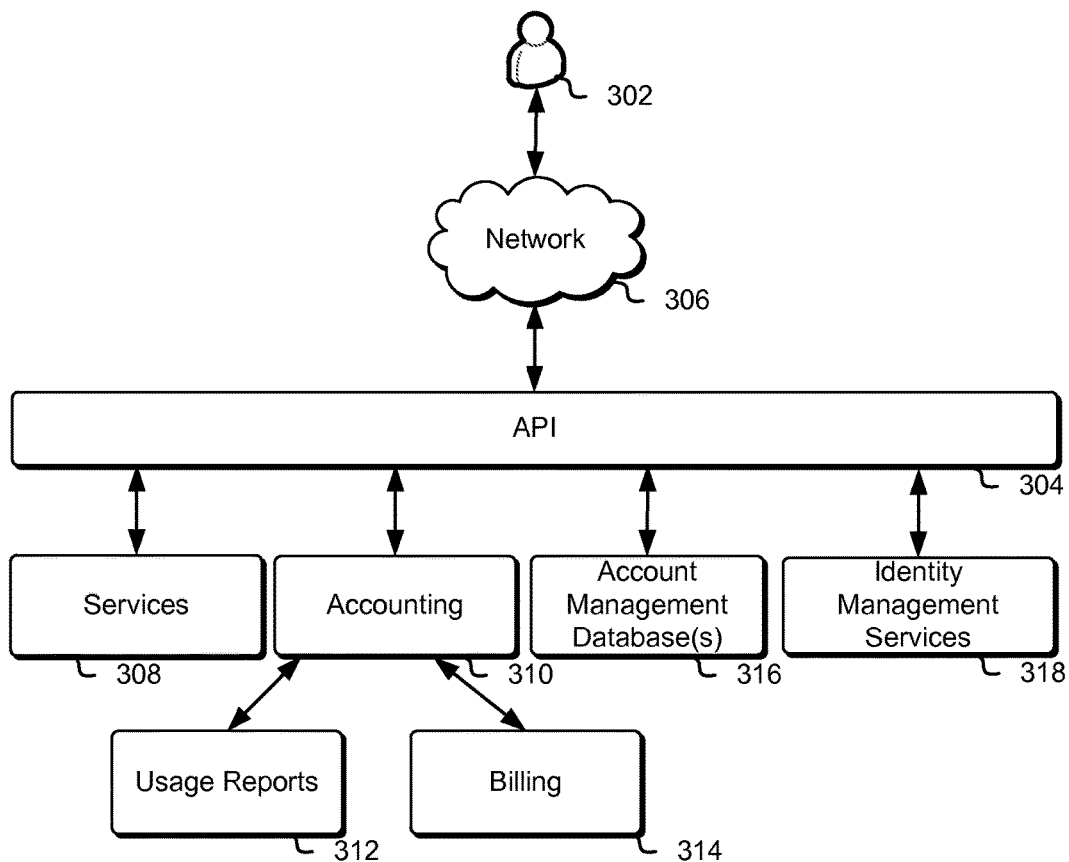
FIG. 3 illustrates an example process of interacting with services and resources of at least one embodiment.

FIG. 3 illustrates an aspect of an environment 300 in which an embodiment of the present disclosure may be practiced. As illustrated in FIG. 3, the environment 300 may include a user 302 (through an associated computing device) initiating API 304 calls through a network 306. The API calls may perform specific operations on the various resources within the environment 300, such as general services 308, accounting services 310, including usage reports 312 and billing 314 operations, one or more account management databases 316 for storing records pertaining to the administration of entities and relationships between entities and between entities and computing resources 112 the entities may access. API 304 calls may further include calls to identity management services for performing operations relating to access security and the management of individual users, authorizations, policies and permissions.

Figure 4:
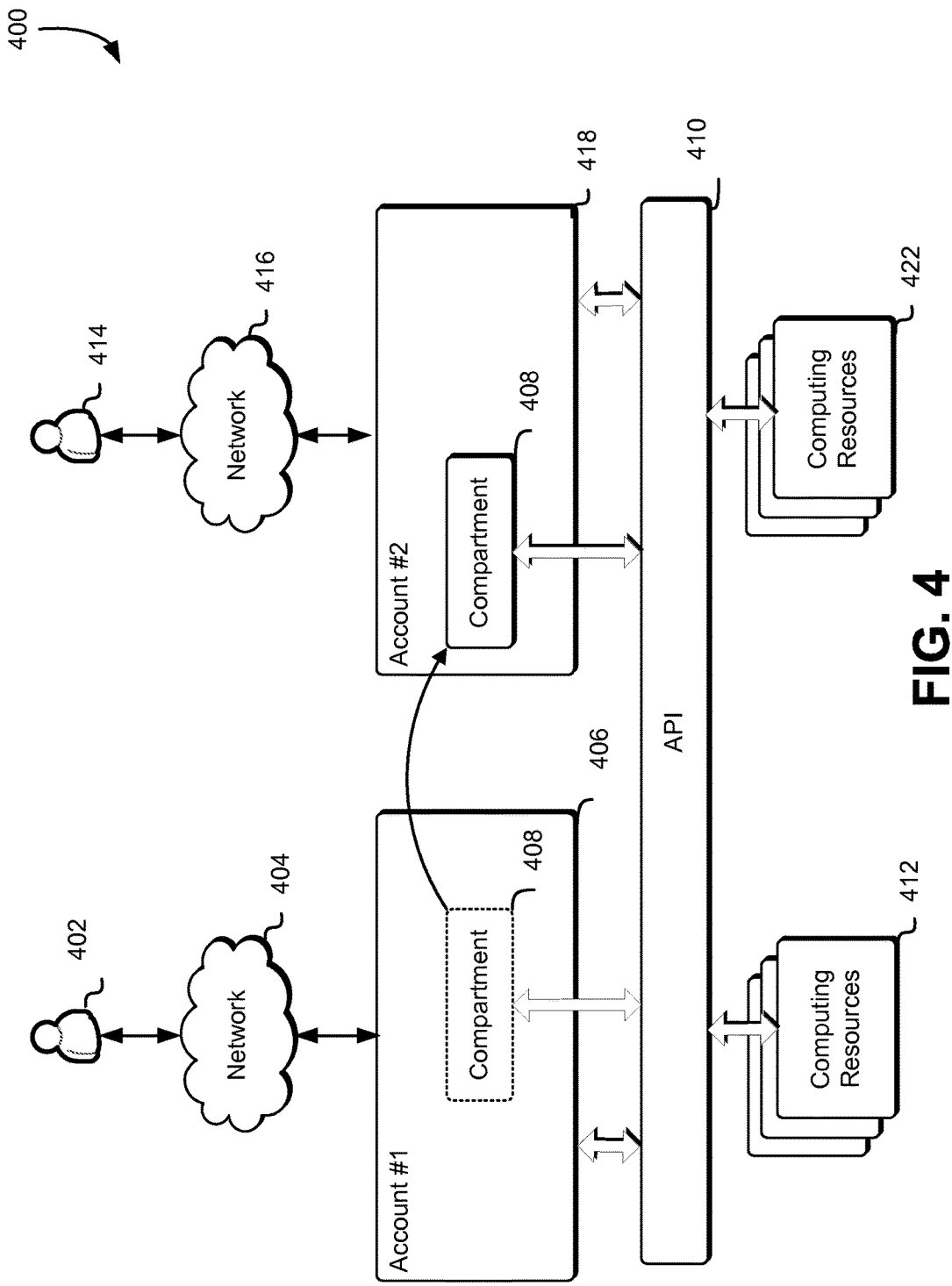
FIG. 4 illustrates an example transfer of a compartment from one account to another account in accordance with at least one embodiment.

FIG. 4 illustrates an aspect of an environment 400 in which an embodiment of the present disclosure may be practiced. As illustrated in FIG. 4, the environment 400 may include a user 402 who may access, through a network 404, an account 406 of which the user may be a member. It is noted that user 402 may be an individual (using an associated computing device), system, service, computing device, or other entity authorized to access the account 406. Whether an entity is authorized to perform any particular action may be determined by an API call digitally signed using a proper credential. It is further noted that examples of the network 404 include the same examples given above for the network 106 in FIG. 1 and also discussed below. The account 406 may have one or more compartments 408 already within it, or the user or a service of the account may generate the one or more compartments 408 within the account 406. As disclosed above, both the account 406 and the one or more compartments 408 within the account may call an API 410 to access or instantiate computing resources 412, and the API 410 may regard calls from the one or more compartments 408 as if the calls had been made by the account 406, with one exception being that the policies, roles and permissions of the one or more compartments 408, generally the same or more restrictive than the policies, roles and permissions of the account 406, will be applicable.

Within this environment 400, there may be a second user 414 who may access, through a network 416, a second account 418. It is noted that user 414, as with the user 402, may be an individual, system, resource, computing device, or other entity authorized to access the second account 406. Whether an entity is authorized to perform any particular action may be determined by an API call that includes a digital signature generated using a user credential of the entity. It is further noted that examples of the network 416 include the same examples given above for the network 106 in FIG. 1, and may either be the same network as the network 404 or a different network. In this environment, the user 402 may seek to transfer ownership of the one or more compartments 108 to the second account 418; i.e., to dissociate the one or more compartments from the parent container to the second account. If the user 402 has authorization to do so, the user 402 may cause a call to API 410, through the parent container, the account 406 in this case, of the one or more compartments 408, to transfer ownership of the one or more accounts 408 to the second account 418. In other words, the user may perform an API call in a manner demonstrating authority (e.g., by an authentic digital signature) to cause the compartment 408 to transfer to the account 418. A system providing the API 410 may perform operations to records defining the parent-child relationship of the account 406 and the one or more compartments 408, including any necessary update to accounting/billing records, updating the records to indicate the second account 410 as the parent container of the one or more compartments 408. In one example, a user of the second account 418 indicates acceptance of the ownership transfer before the second account 418 may assume ownership of the one or more compartments 418; if no acceptance is received, the parent-child relationship between the account 406 and the one or more compartments 408 may be unchanged.

After the second account 418 becomes the parent container of the one or more compartments 408, calls including credentials associated with the one or more compartments 408 are viewed by API 410 as if the calls had been made by using credentials of the account 418, with the same exceptions regarding the policies, roles and permissions of the one or more compartments 408. In this case, however, more restrictive policies, roles and permissions of the parent container, here being the second account 418, may take precedence over less restrictive policies, roles and permissions of the one or more compartments 408. Effectively, the one or more compartments 408 may be treated by the API 410 as if the one or more compartments had been originally created within the second account 418. In at least one embodiment, the one or more compartments 408 may now have access to certain computing resources 422 accessible to the second account 418, but not accessible to the account 406. In at least another embodiment, the one or more compartments 408 may still retain access to certain computing resources 412 of the account 406 that the one or more compartments 408 had access to prior to the transfer of ownership from the account 406 to the second account 418. As another embodiment that may be combined with various embodiments, the compartment may have multiple parent containers; i.e., compartments may be shared between containers.

Figure 5:
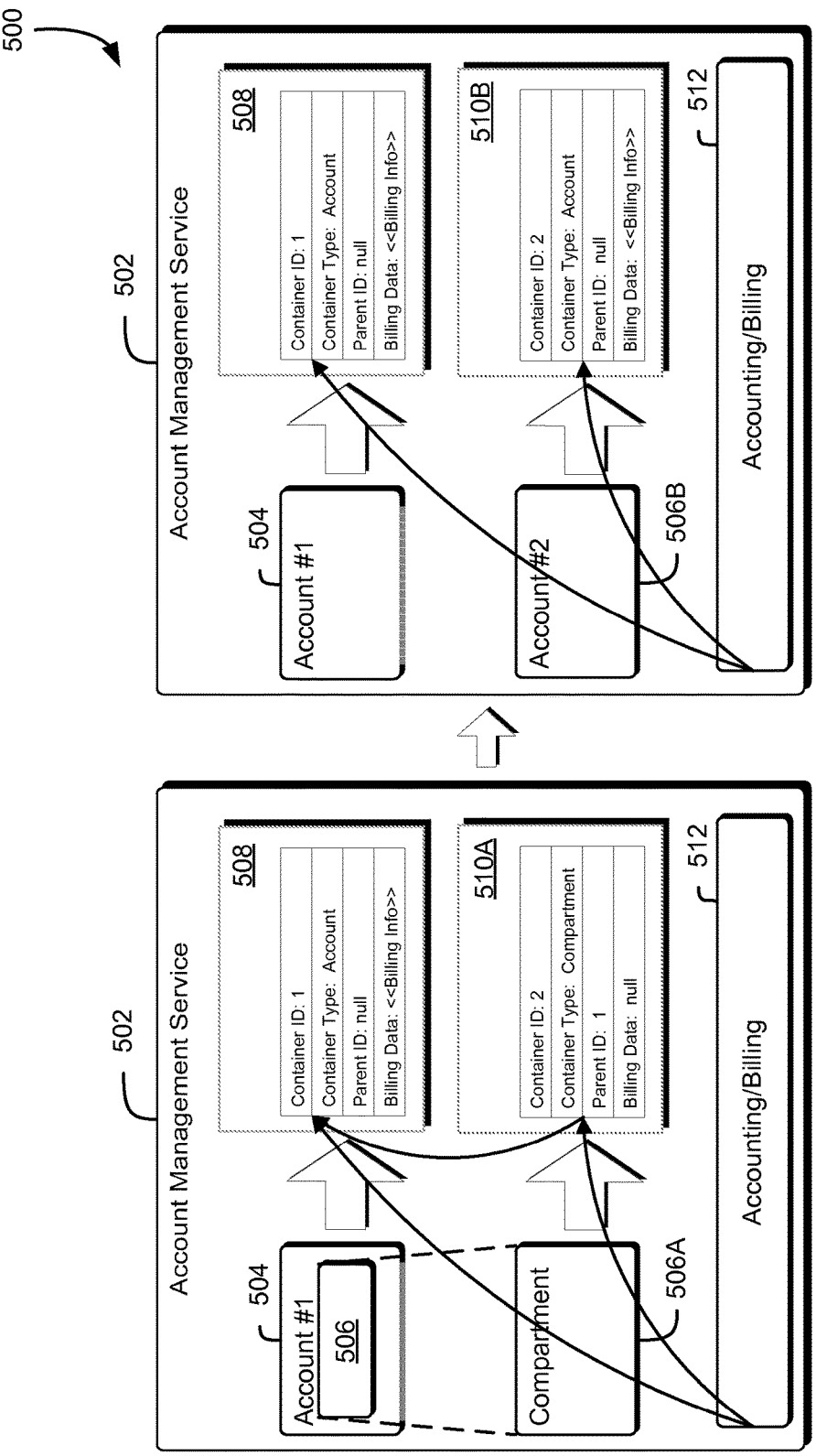
FIG. 5 illustrates an example relationship between the account billing service and the container records in accordance with at least one embodiment.

FIG. 5 illustrates an aspect of an environment 500 in which an embodiment of the present disclosure may be practiced. As illustrated in FIG. 5, the environment 500 may include an account management service 502 for managing information and privileges associated with at least one account 504 and at least one compartment 506A. As with other services described herein, the account management service may be a computer system comprising computing resources configured to perform various operations, as described elsewhere herein. The account management service may be a distributed computer system comprising compute, data storage (e.g., block-level and/or database storage), networking and/or other computing resources that are collectively configured to perform operations described herein. The account 504 may be associated with at least one record 508, and the compartment 506A may be associated with at least one record 510A containing metadata about the respective entities and the parent-child relationship between the account 504 and the compartment 506A. Note that in this illustration, the record 510A indicates that the principal container type of the compartment 506A is "Compartment," whereas the record 508 indicates that the principal container type for the account 504 is "Account." Further, in this illustration, the record 510A indicates that the compartment 506A is a child of the account 504 by having the Parent ID field configured to the value of the Customer ID field in record 508. In at least one embodiment, an account may be distinguishable from a compartment because the record associated with the entity indicates a principal type of the entity. Various alternate methods exists for distinguishing an account from a compartment, including, but not limited to, where an account may be distinguishable from a compartment because the record associated with the entity indicates that the entity has a parent container, in the case of a compartment, or that the entity has no parent container, in the case of an account.

The environment 500 may also include an accounting/billing service 510A for determining the responsibility for billing costs incurred by accounts and compartments. The accounting/billing service 512 may determine that the account 504 is responsible for costs incurred by the account 504 by first checking the Parent ID field in the record 508, and, finding the field value null, may recognize that the account 504 has no parent container and is therefore the top entity in its hierarchy. The effect of the link between the Parent ID field of the record 510A and the Container ID field of the record 508 may be that when the accounting/billing service 512 is determining responsibility for costs incurred by the compartment 506A, it first checks the Parent ID field in the record 510A, which refers the accounting/billing service 512 to the record 508. The accounting/billing service 512 may then check the Parent ID field in the record 508, and, finding the field value null, may recognize that the account 504 has no parent container and is therefore the top entity in its hierarchy, and, consequently, the entity responsibility for costs incurred by the compartment 506A. In one example, the accounting/billing service 512 firsts checks the principal container type prior to checking the Parent ID field, and if the principal container type is "Account," the accounting/billing service determines that the respective entity of the record is the entity responsible for costs incurred and querying the Parent ID field may be unnecessary. However, as noted, another embodiment usable in combination with other embodiments may be where a compartment maintains separate billing records and responsibility. An advantage of such an embodiment could be where an account owner may have separate compartments for different regions with different taxation requirements, such as an international account owner with a European compartment for one division of the company and a United State compartment and another division of the company, and billing responsibilities may need to be maintained separately for each compartment.

As illustrated, FIG. 5 further depicts changes that may occur when the compartment 506A of the account 504 is converted to be a separate account 506B. The compartment 506A may become an account 506B by changes made to the record 510A, which may be depicted in record 510B. For example, the Parent ID field of record 510A is changed to null in record 510B, and likewise the principal container type of record 510A is changed from "Compartment" to "Account" in record 510B. The effect of this change may mean that, in addition to determining that the account 504 is responsible for costs incurred by account 504 as described above, when the accounting/billing service 512 is determining responsibility for costs incurred by the account 506B, the accounting/billing service 510 may realize either that the Parent ID field in the record 510B is now null or that the principal container type in the record 510B is "Account," either of which may indicate the account 506B as responsible for its own incurred costs rather than the account 504. In one example, the account 506B may only be responsible for costs incurred after the compartment 506A was converted to be the account 506B. In another example, the account 506B may be responsible for at least some costs incurred while account 506B was still the compartment 506 under the account 504. However, as noted, there may be various alternatives to determining billing responsibility, including that the compartment may maintain its own records detailing responsibility for its own billing charges.

Figure 6:
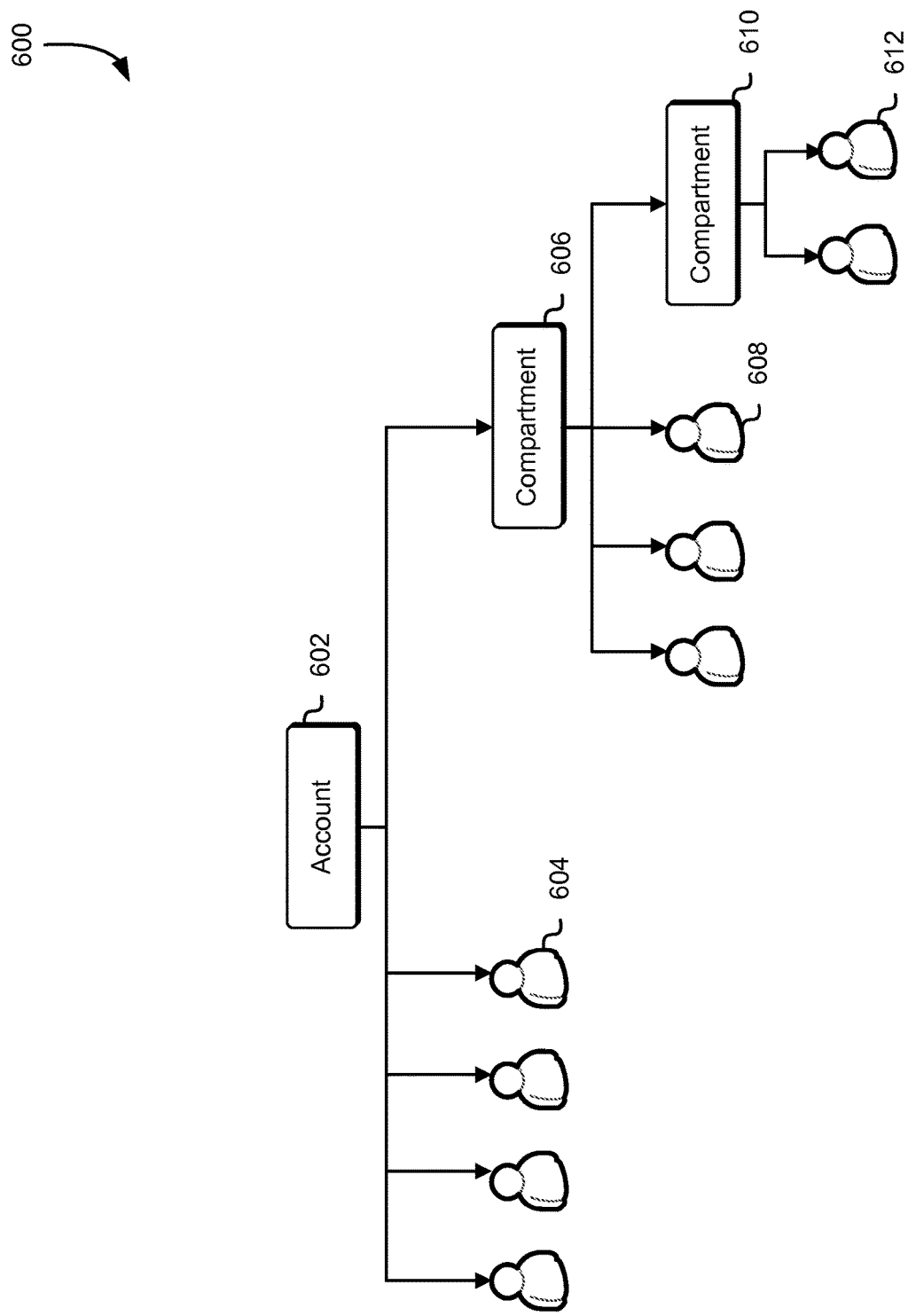
FIG. 6 illustrates an example hierarchy and nesting of compartments in accordance with at least one embodiment.

FIG. 6 illustrates an aspect of an environment 600 in which an embodiment of the present disclosure may be practiced. As illustrated in FIG. 6, the environment 600 includes an account 602. The account 602 may have one or more users 604 who have access to the account 602. Further, the account 602 may also have one or more compartments 606, and each of the one or more compartments 606 may have one or more of its own users 608. Further, the compartment 606 may also have one or more of its own compartments 610, and each of the one or more compartments 610 may have one or more of its own users 612. Note that any, all, or none of the users 604, 608 and 612 may be an individual, system, service, computing device, or other entity authorized to access the respective containers. Whether an entity is authorized to perform any particular action may be determined by an API call that includes a digital signature generated using a user credential of the entity. In at least one embodiment, there may be no limit to the number of compartments that may be nested within other compartments. In at least another embodiment, there may be a limit to the depth level of nested compartments that may be created within the account 602 account. As another embodiment that may be combined with various embodiments, the depth level of nested compartments may be limited to one. As still another embodiment combinable with other embodiments, all of the users of a child entity may also be users of its parent container; for example, all of the one or more users 612 may be members of the group of one or more users 608, and all of the one or more users 608 may be members of the group of one or more users 604. As another possible embodiment, users associated with a compartment may not necessarily be users associated with the parent container; for example, at least a subset of the one or more users 612 may not be present within the group of one or more users 608, and at least a subset of the one or more users 608 may not be present within the group of one or more users 604.

Figure 7:
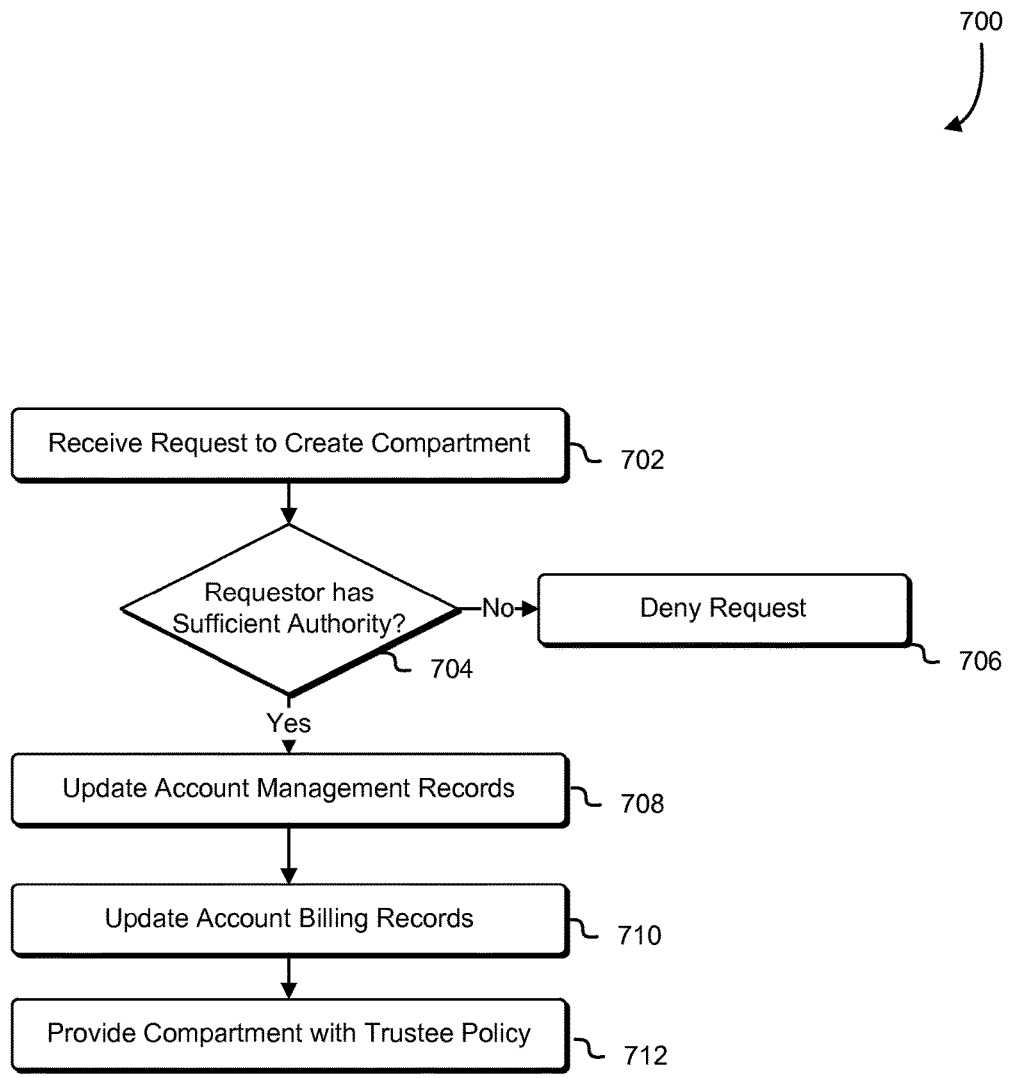
FIG. 7 is a flow chart that illustrates an example of creating of a compartment in accordance with at least one embodiment.

FIG. 7 is a flow chart illustrating an example of a process 700 for creating a compartment within an account in accordance with various embodiments. The process 700 may be performed by any suitable system, which may be an account management service, such as described above, which may be implemented using one or more devices discussed in connection with FIG. 23. In 702, a device of the system performing the process 700 receives a request to create a compartment. Examples of the type of computing device receiving the request include, but are not limited to, at least one of a server, a distributed computing system, a mobile device, a virtual computing system, and any other device as described below.

In 704, a computing device performs a check of the role of the requestor and applicable security policies to determine whether the requestor has sufficient permission to perform the requested action (i.e., creation of a compartment within the associated account). If the requestor does not have sufficient permissions to perform the action, the computing device denies the request in 706 and no further processing may be performed in environment 700. Otherwise, if the requestor does have sufficient permission, the device performing the process 700 proceeds to 708, wherein one or more records are generated to define the compartment structure, generating a sequence of policies, roles and permissions of the parent account and account users to apply to the compartment, instantiating any desired resources within the compartment, and linking the compartment structure to the parent account. Note that operations performed in 708 may be performed in various orders and may be performed by separate services or systems. Examples of resources that may be instantiated within the compartment include, but are not limited to virtual computing system services, database services, block database services, archive database services and other database services. As noted, the requestor may be a service making the request in response to a customer request, pending authorization based on the customer's credentials.

In 710, account billing records may be updated to reflect the creation of the compartment, such that costs incurred by instantiated resources or resources executing within the compartment can be billed to the proper customer. In 712, one or more records may be updated to configure an appropriate trustee policy for the new compartment; an example of providing a compartment with a trustee policy includes, but is not limited to, imparting at least one of one or more services, one or more roles and one or more users of the parent account with a role of trustee and/or administrator of the compartment, the trustee and/or administrator role having full access to administrate the compartment. Note the operations performed in 708, 710 and 712 may be performed in various orders, including in parallel, and each operation may be performed by one or more devices different from the devices performing any of the other operations in process 700.

Figure 8:
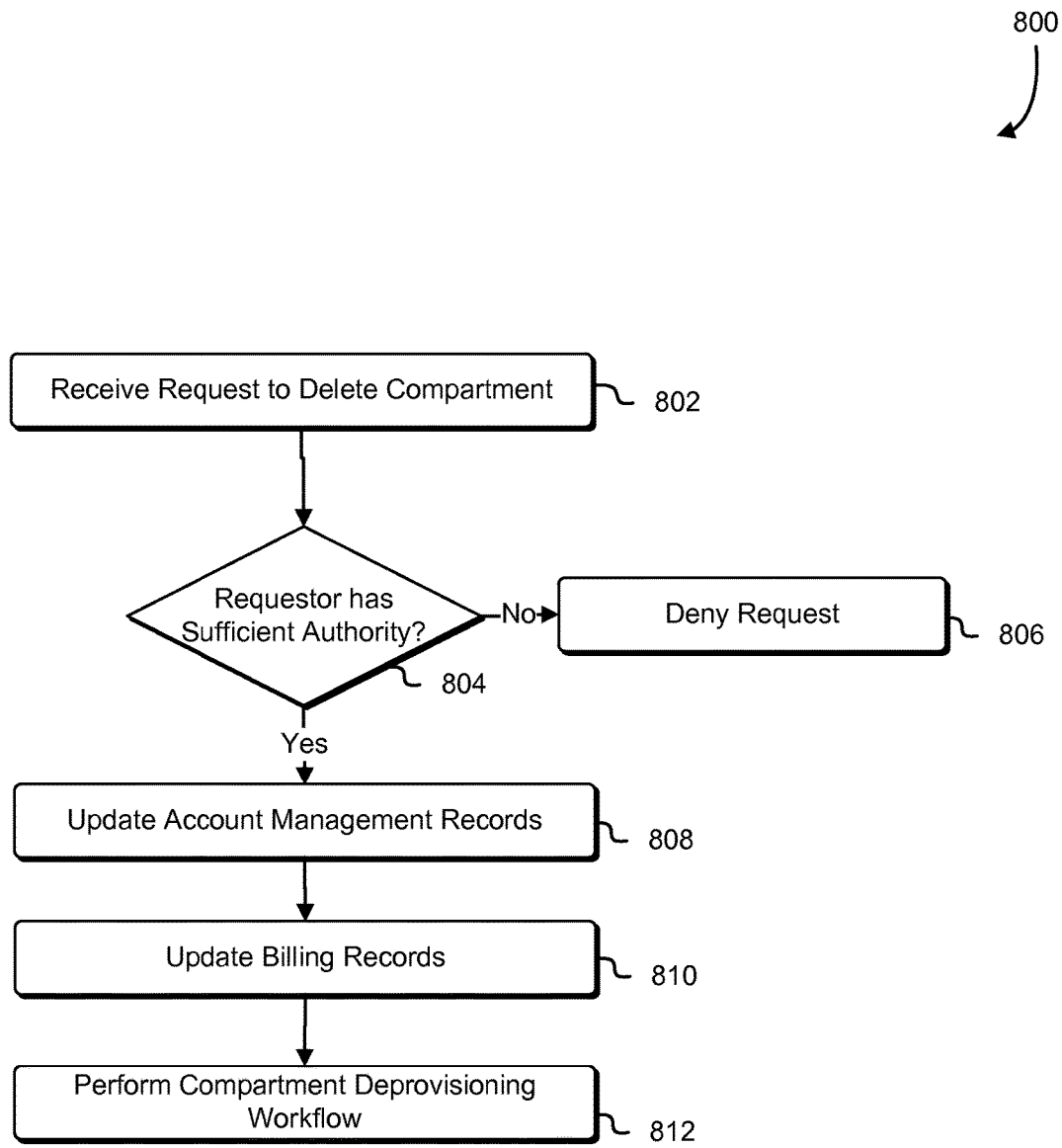
FIG. 8 is a flow chart that illustrates an example of termination of a compartment in accordance with at least one embodiment.

FIG. 8 is a flow chart illustrating an example of a process 800 for deleting a compartment in accordance with various embodiments. The process 800 may be performed by any suitable system, which may be an account management service, such as described above, which may be implemented using one or more devices discussed in connection with FIG. 23. In 802, a device of the system performing the process 800 receives a request to delete a compartment. Examples of the type of computing device receiving the request include, but are not limited to, at least one of a server, a distributed computing system, a mobile device, a virtual computing system, and any other device as described below. As noted, the requestor may be a service making the request in response to a customer request, pending authorization based on the customer's credentials.

In 804, the computing device performs a check of the role of the requestor and any applicable security policies to determine whether the requestor has sufficient permission to perform the requested action (i.e., deletion of the compartment within the associated account). If the requestor does not have sufficient permissions to perform the action, the computing device denies the request in 806 and no further processing may be performed in environment 800. Otherwise, if the requestor does have sufficient permission, the device performing the process 800 proceeds to 808, wherein the account management records may be updated to reflect that the compartment no longer exists. In one example, one or more records defining the compartment structure may be deleted. In another example, one or more records defining the compartment may be updated to reflect that the compartment is inactive.

In 810, billing records may be updated to reflect that the compartment no longer has the ability to incur costs, and any outstanding costs incurred by the compartment may be updated and re-associated with the parent account. In one example, past costs incurred by the compartment remain associated with the compartment for historical reference, troubleshooting, and reporting purposes.

In 812, a compartment de-provisioning workflow process is performed. Examples of operations that may be performed at this step include, but are not limited to any or none of the following, transferring any unused long-term commitment instances within the compartment to the long-term commitment instance pool of the parent account, transferring assigned quotas from the compartment to the quota pool of the parent account, and de-provisioning any active resources instantiated within the compartment. Examples of resources that may be instantiated within the compartment include, but are not limited to virtual computing system services, database services, block-level database services, archive database services and other database services. Note that the operations performed in 808, 810 and 812 may be performed in various orders, including in parallel, and each operation may be performed by one or more devices different from the devices performing any of the other operations in process 800.

Figure 9:
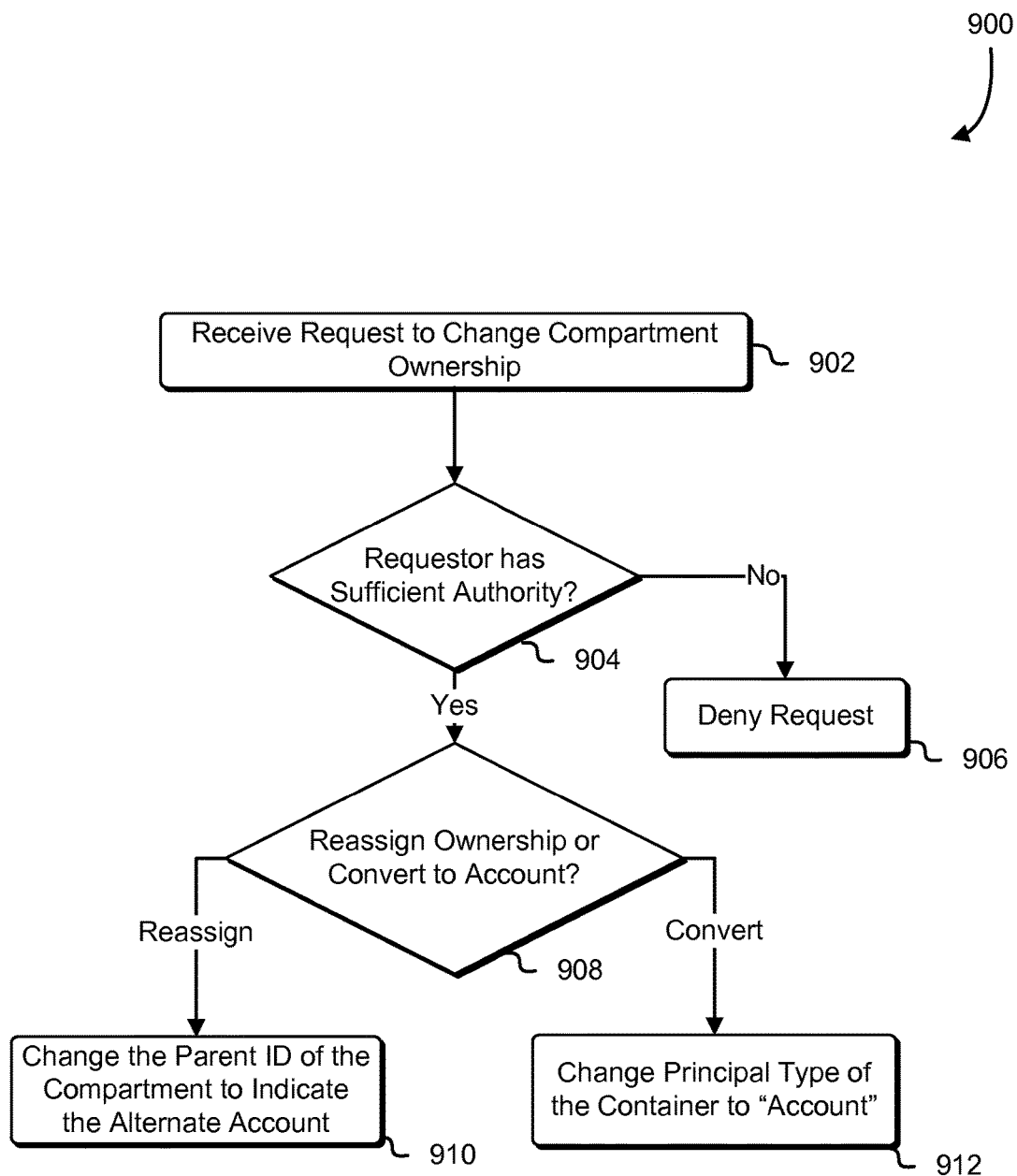
FIG. 9 is a flow chart that illustrates an example of changing the ownership or type of a compartment in accordance with at least one embodiment.

FIG. 9 is a flow chart illustrating an example of a process 900 for changing ownership or promoting a compartment to be an account in accordance with various embodiments. The process 900 may be performed by any suitable system, which may be an account management service, such as described above, which may be implemented using one or more devices discussed in connection with FIG. 23. The process 900 includes a series of operations wherein the parent-child relationship of an account and compartment may be changed to reflect either the compartment being assigned to a different account or the compartment being promoted to an account. In 902, a device of the system performing the process 900 receives a request to change the owner of a compartment. Examples of the type of computing device receiving the request include, but are not limited to, at least one of a server, a distributed computing system, a mobile device, a virtual computing system and any other device as described below. As noted, the requestor may be a service making the request in response to a customer request, pending authorization based on the customer's credentials.

In 904, the computing device performs a check of the role of the requestor and any applicable security policies to determine whether the requestor has sufficient permission to perform the requested action (i.e., changing the ownership of the compartment). If the requestor does not have sufficient permissions to perform the action, the computing device denies the request in 906 and no further processing may be performed in environment 900. Otherwise, if the requestor does have sufficient permission, the device performing the process 900 proceeds to 908, wherein the computing device determines whether the requestor has requested a reassignment of ownership to another account or a conversion of the compartment into an account.

If the requestor has indicated that the compartment may be assigned to another specified account, the device performing the process 900 proceeds to 910 where the computing device updates one or more account management records to reflect that the parent of the compartment now be the other specified account. In one example, the operation may further include updating account billing records to indicate that costs incurred by users and services within the compartment that occurred prior to the ownership reassignment may be the responsibility of the previous parent account, whereas all new costs incurred with the compartment become the responsibility of the new parent account. In still another example, the compartment may have its own corresponding billing records to be updated to indicate the parties responsible for billing and auditing charges.

In still another example, handshaking may be required; that is, when an entity requests to transfer a compartment to another account, a user or other entity with sufficient authority in the specified other account (as may be determined by passing a proper digitally signed credential to an API) must approve reassignment of the compartment to the other account. For example, a vendor may list a compartment for sale, whereupon the buyer may need to approve for the compartment to be transferred from the vendor's account to the buyer's account. Note that handshaking may be present in other cross-account and cross-compartment operations described herein, such as one account may require authenticated approval from another account to administrate or perform maintenance from the other account, or a lessor account may need to provide authenticated approval for certain requests by a compartment lessee, such as a request to delete the compartment.

Otherwise, if the requestor has indicated that the compartment may be converted into an account, the device performing the process 900 proceeds to 912 where the computing device updates one or more account management records to reflect that the previous account is no longer a parent of the compartment and that the principal type of the structure defining the compartment is now an account. In one example, a field indicating the identity of a parent container may be sufficient to distinguish an account from a compartment; e.g., a compartment entity will have a parent and an account entity will have no parent. In another example, the field reflecting the principal type of the container may be sufficient to distinguish an account from a container. As another example, account billing records may be further updated to reflect that costs incurred by the new account (formerly the compartment) may be the responsibility of the new account and not associated with the previous parent. As yet another example the operation may further include updating account billing records to indicate that costs incurred by users and services within the compartment that occurred prior to the conversion may be the responsibility of the previous parent account, whereas all new costs incurred with the new account become the responsibility of the new account. In at least another example, an account may be converted (e.g., demoted) to be a compartment and subsequently assigned to another container.

Figure 10:
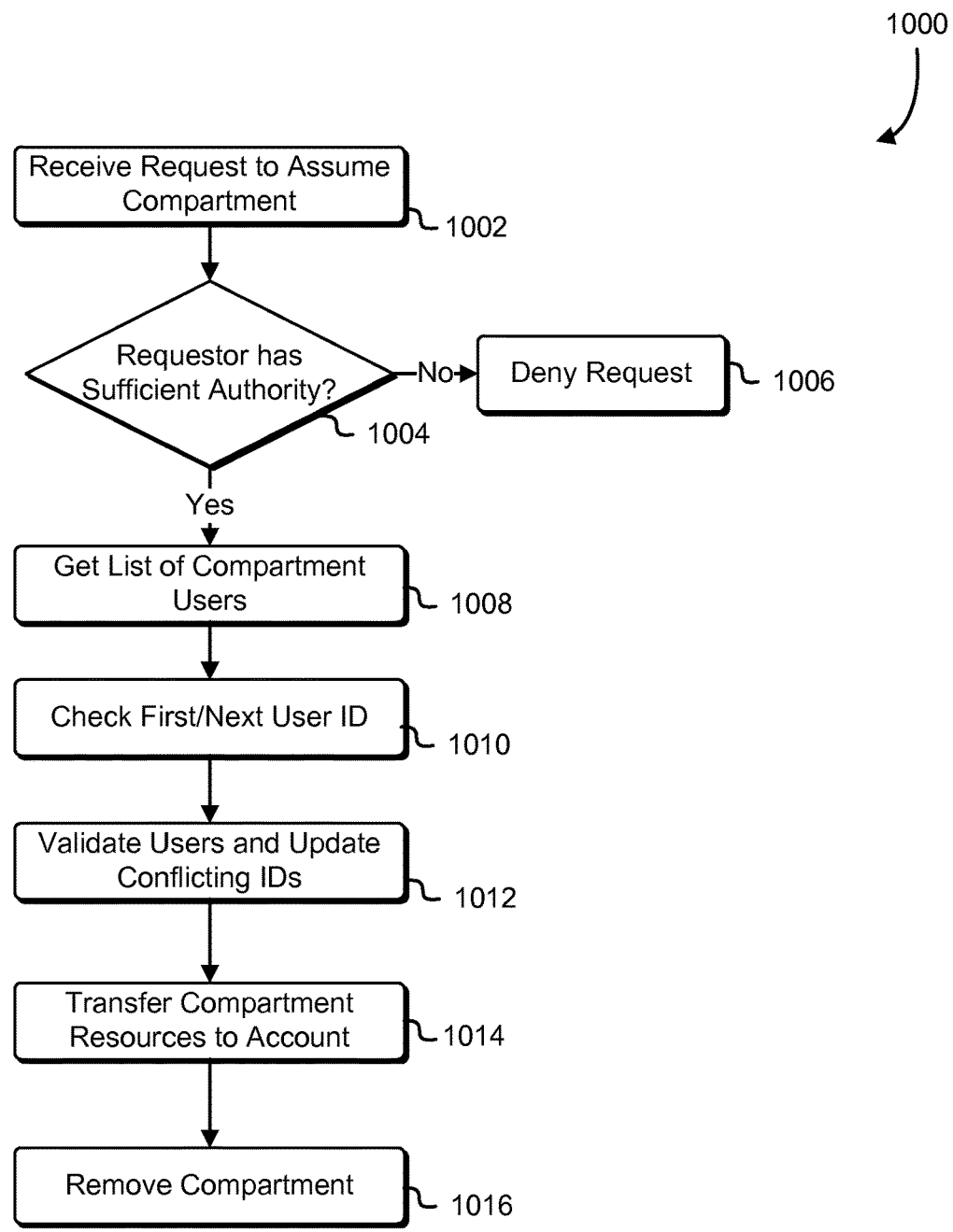
FIG. 10 is a flow chart that illustrates an example of an account assuming the contents of a compartment in accordance with at least one embodiment.

FIG. 10 is a flow chart illustrating an example of a process 1000 for assuming a compartment in accordance with various embodiments. The process 1000 may be performed by any suitable system, which may be an account management service, such as described above, which may be implemented using one or more devices discussed in connection with FIG. 23. The process 1000 includes a series of operations wherein a compartment may be dissolved and the parent account assumes (e.g., absorbs) one or more users or services of the compartment into itself. In 1002, a device of the system the process 1000 receives a request to assume a compartment. Examples of the type of computing device receiving the request include, but are not limited to, at least one of a server, a distributed computing system, a mobile device, a virtual computing system and any other device as described below. As noted, the requestor may be a service making the request in response to a customer request, pending authorization based on the customer's credentials.

In 1004, the computing device performs a check of the role of the requestor and applicable security policies to determine whether the requestor has sufficient permission to perform the requested action (i.e., assuming the contents of the compartment). If the requestor does not have sufficient permissions to perform the action, the computing device denies the request in 1006 and no further processing may be performed in environment 1000. Otherwise, if the requestor does have sufficient permission, the device performing the process 1000 proceeds to 1008, wherein the computing device begins by obtaining a list of users within the compartment.

In 1010 and 1012, the computing device compares the username or identity of each user within the compartment with current users within the parent account. Users that do not currently exist in the parent account may be assumed by the parent account, retaining any policies, roles and permissions applicable to compartment resources that are also being assumed. Users of the parent account who also have membership as users in the compartment being assumed may be retained in the parent account and their security records may be updated to retain policies, roles and permissions applicable to compartment resources that are also being assumed. In some embodiments, compartment users matching a username or user identity of a user in the parent account, but who may actually be different users, may be updated to generate a unique username or identity for the compartment user before being assumed by the parent account. In one example, the users of the compartment may not be assumed by the account, and, once the computing device determines that the requestor has sufficient permissions to perform the action in 1004, the device performing the process 1000 proceeds instead to 1014.

In 1014, the computing device transfers the instantiation of resources in the compartment to the parent account. Also in 1014, relevant accounting and billing records may be updated to reflect that the resources may now be instantiated in the parent account. In one example, the costs incurred by the compartment may be transferred to the parent account. In another example, the costs incurred by the compartment remain associated with the compartment, but records may be updated to reflect that parent account may be responsible for the costs. In still another example, only a subset of the one or more users, one or more resources within the compartment may be assumed by the parent account, and those remaining may be de-provisioned. Lastly, in 1016, the compartment may be removed in accordance with operations similar to those illustrated in FIG. 8. Note that the operations performed in 1008-1010, 1012-1014 and 1016 may be performed in various orders, including in parallel, and each operation may be performed by one or more devices different from the devices performing any of the other operations in process 1000.

Figure 11:
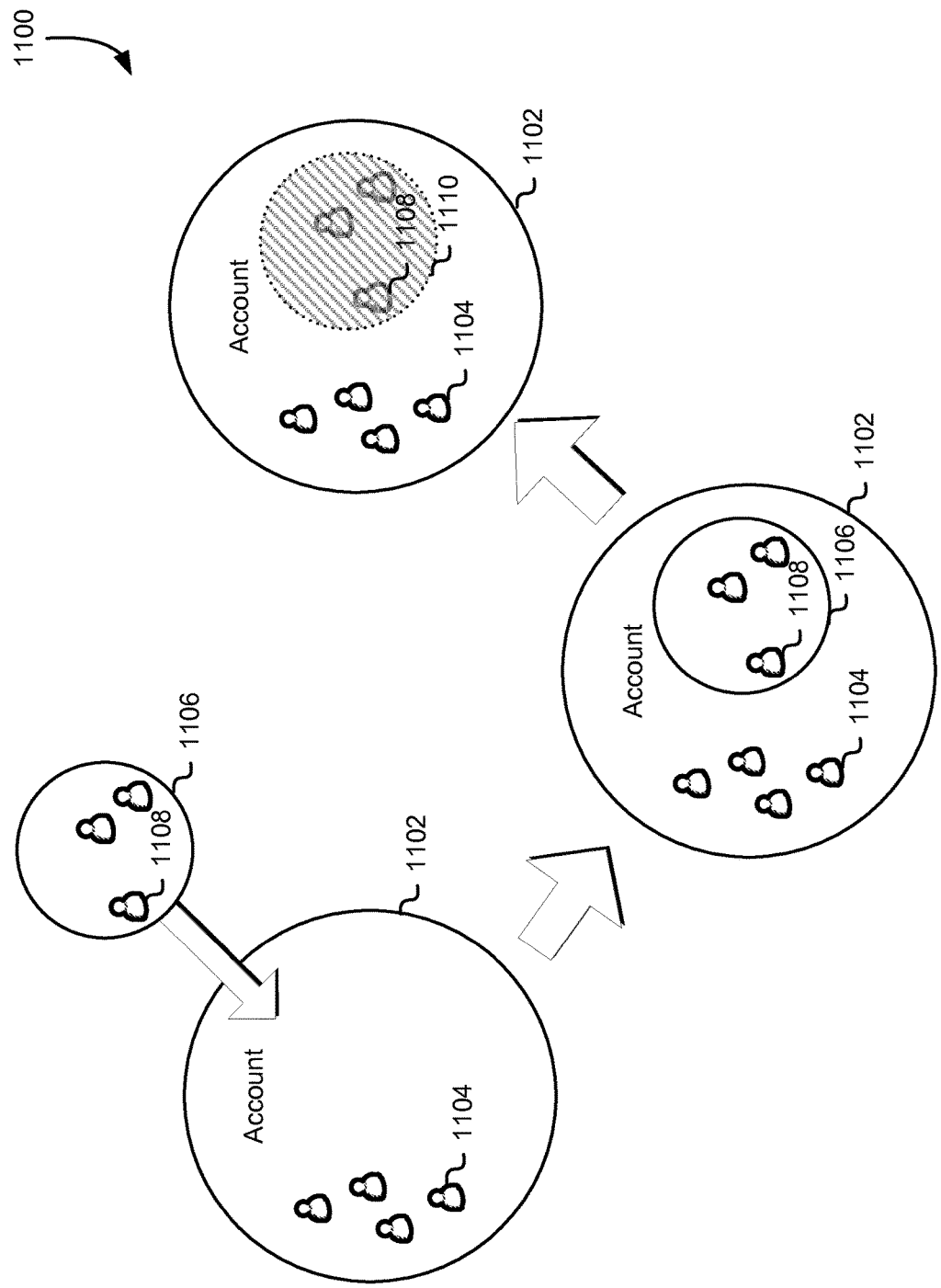
FIG. 11 illustrates an example of an account being assigned ownership of a compartment, which may be a hidden compartment in accordance with at least one embodiment.

FIG. 11 illustrates an example process of an environment 1100 in which an embodiment of the present disclosure may be practiced. As illustrated in FIG. 11, the environment 1100 includes a parent container 1102. The parent container 1102 may be an account, a compartment, or another entity in which a compartment may be contained. The parent container has a number of associated users 1104 having one or more permissions, roles and/or policies assigned. It is noted that users 1104 may individually be any of an individual, system, service, computing device, or other entity authorized to access the parent container 1102, as may be determined by passing a proper digitally signed credential to an API.

The parent container 1102 may further be the owner of a compartment 1106. The compartment 1106 is a compartment that may have been transferred to the parent container 1102 from some other container entity (i.e., dissociated from the other container entity and associated with the parent container 1102), may have been converted from an account into a compartment and assigned to the parent container 1102, or may have been created within the parent container 1102 and is still contained within parent container 1102. The users 1104 of the parent container may have access to the compartment 1106, as defined by the roles, policies and permissions associated with the users 1104.

The compartment 1106 may further contain one or more users 1108 having one or more permissions, roles and/or policies within the compartment 1106; however users 1108 in the compartment 1106 do not necessarily have access to the parent container unless at least some of the users 1108 are also members of the users 1104. The compartment 1106 may alternately be created as or converted to be a hidden compartment 1110. A hidden compartment may be substantially similar to a standard compartment 1106, but with restrictions on the access that users 1104 have over the hidden compartment 1110.

Figure 12:
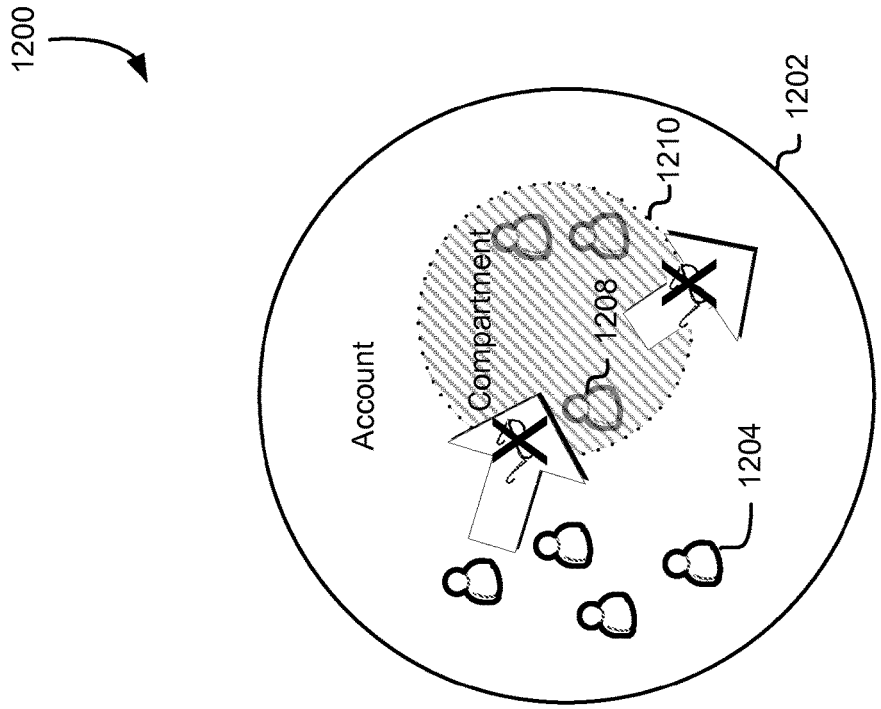
FIG. 12 illustrates an example of a difference between a standard compartment and a hidden compartment in accordance with at least one embodiment.
Figure 12:
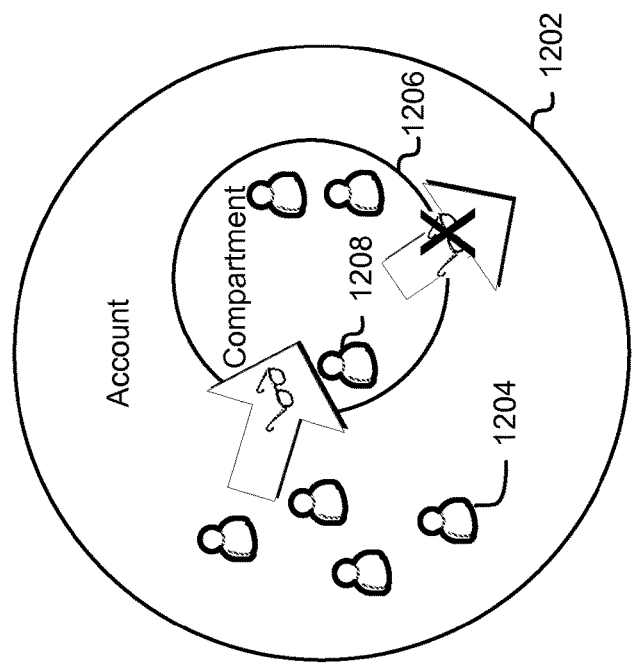

FIG. 12 illustrates an example process of an environment 1200 in which an embodiment of the present disclosure may be practiced. As illustrated in FIG. 12, the environment 1200 compares an account 1202, having one or more users 1204, with a standard compartment 1206 against that account 1202 if it had a hidden compartment 1210 instead of the standard compartment 1206. It is noted that any or all of the users 1204 and/or 1208 may be an individual, system, service, computing device, or other entity authorized to access the respective account 1202, compartment 1206, or compartment 1210 in which they reside. Authorization may be determined by passing a proper digitally signed credential to an API. It is further noted that, although the standard compartment 1206 and the hidden compartment 1210 are shown in FIG. 12 as residing within an account container, the account 1202 could just as easily be another container or other container type suitable for containing compartments.

The difference between a standard compartment 1206 and a hidden compartment 1210 is illustrated with arrows showing that one or more users 1204 may view and/or have other access to resources instantiated within the standard compartment 1206, whereas the users 1208 do not necessarily have visibility or access to resources contained within account 1202 exclusive of the resources contained within compartment 1206. With a hidden compartment 1202, as with the standard compartment, the users 1208 do not necessarily have visibility or access to resources contained within account 1202 exclusive of the resources contained within the compartment 1210. However, with a hidden compartment 1210, at least some of the users 1204 may not have the ability to view and/or access resources contained within the compartment 1210. The users 1208 have access to the resources of the hidden compartment 1210 as usual as defined by the particular policies, roles and permissions assigned to the users 1210. Uses for the hidden compartment include, but are not limited to, setting up user space and instantiations of resources for secret projects, confidential data, resources that need to generate instantiations in a workspace protected from interference by users 1204. In at least one embodiment a standard compartment may be converted to type of hidden compartment and vice versa. In at least another embodiment, a hidden compartment may be created in a similar manner as a standard compartment except for having a principal type of "hidden."

Figure 13:
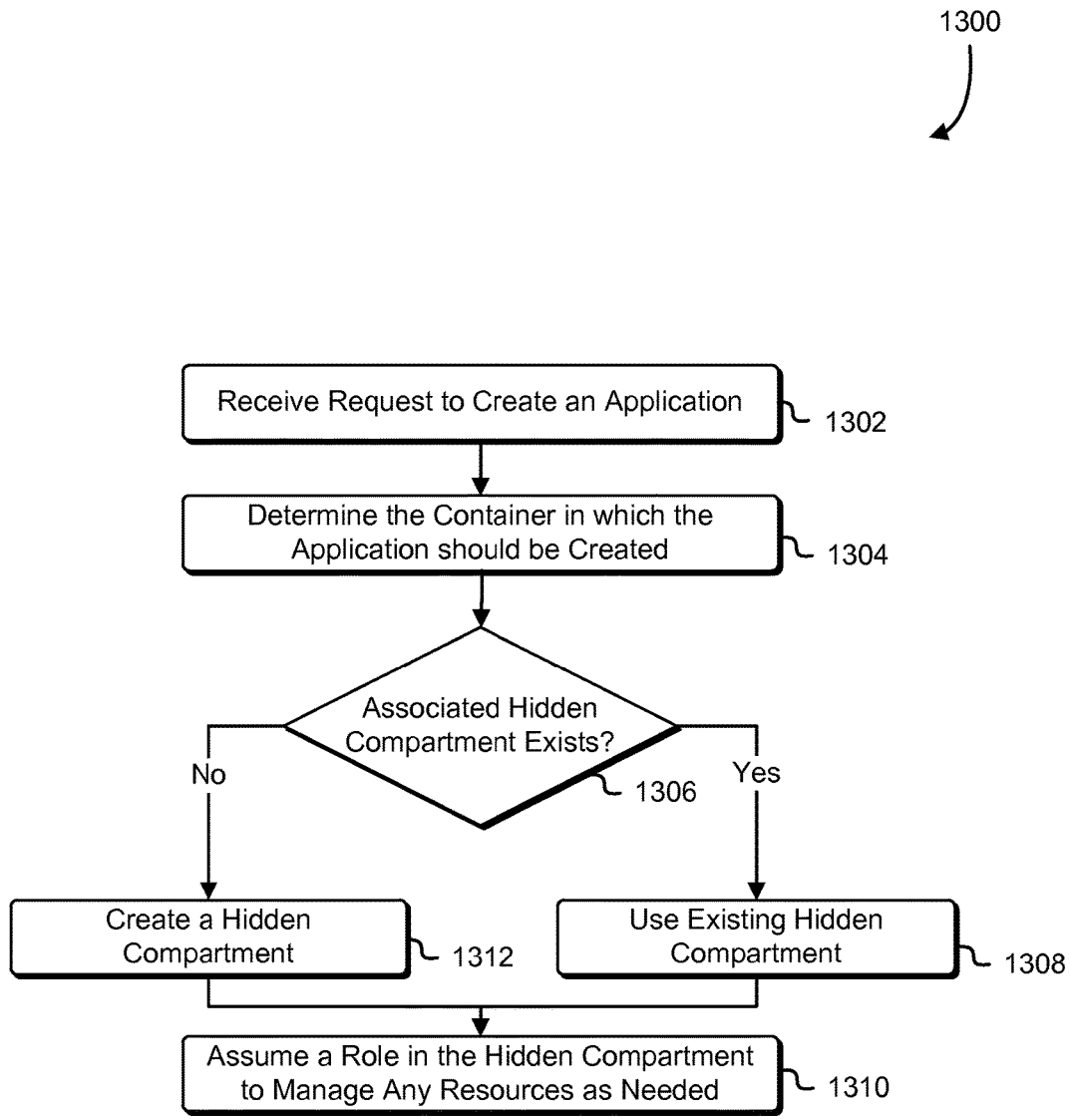
FIG. 13 is a flow chart that illustrates an example of creating a hidden compartment in accordance with at least one embodiment.

FIG. 13 is a flow chart illustrating an example of a process 1300 for creating a hidden compartment in accordance with various embodiments. The process 1300 may be performed by any suitable system, which may be an account management service, such as described above, database service, or any service with suitable permissions for performing the actions, which may be implemented using one or more devices discussed about FIG. 23. As illustrated in FIG. 13, the process 1300 includes a series of operations wherein a resource may be created within a hidden compartment. In 1302, a device of the system performing the process 1300 receives a request to create a resource. Examples of the type of computing device receiving the request include, but are not limited to, at least one of a server, a distributed computing system, a mobile device, a virtual computing system and any other device as described below. As noted, the requestor may be a service making the request in response to a customer request, pending authorization based on the customer's credentials.

After determining that the requestor is authorized to have a resource created, as may be determined by passing a proper digitally signed credential to an API, the device performing the process 1300 proceeds to 1304, wherein the computing device determines the identity of the container in which the hidden compartment will be created in. The identified container may be an account, a compartment, or another type of container in which a hidden compartment may be contained. In at least one embodiment, the identified container will be the container which also contains the identity of the user making the request. In an embodiment where the identity of the user is simultaneously contained within multiple containers, the identified container will be the one currently being accessed by the user in making the request to create a resource. It is noted that the user may be an individual, system, resource computing device, or other entity authorized to access the identified container, as may be determined by passing a proper digitally signed credential to an API.

After identifying the relevant container, the device performing the process 1300 proceeds to 1306, wherein the computing device determines whether a hidden compartment already exists for this purpose (i.e., hosting the requested resource). In one example, a hidden compartment may already exist because it was created by a previous request or requestor. In another example, the hidden compartment already exists because a hidden compartment was previously generated and held in reserve.

If a hidden compartment already exists that may be used for this resource, the device performing the process 1300 selects this hidden compartment and proceeds to 1310. Otherwise, if a hidden compartment does not already exist, the device performing the process 1300 generates a new compartment within the relevant container and sets it to be a hidden compartment. In at least one embodiment, a hidden compartment may be distinguished from a standard compartment by the trustee and/or administrator of the parent container not having view access to resources within the hidden compartment. In at least another embodiment, a hidden compartment may be distinguished from a standard compartment by a principal container type of "hidden" in one or more records defining the compartment. After the hidden compartment is generated, the device performing the process 1300 proceeds to 1310. As another embodiment that may be combined with various embodiments, the existence of a hidden compartment may not normally be viewable to some users in a report or listing of compartments and resources of the parent container. As another embodiment combinable with other embodiments, some users of the parent container may be able to view the hidden compartment in a report or listing of compartments and resources of the parent container, but the users may only have limited visibility or permissions to resources within the hidden compartment. In at least another embodiment, each user or service may be limited to create and/or utilize only a specified number of hidden compartments. In 1310, the service may be assigned a role giving the service permission to manage the hidden compartment and instantiate any resources as needed.

Figure 14:
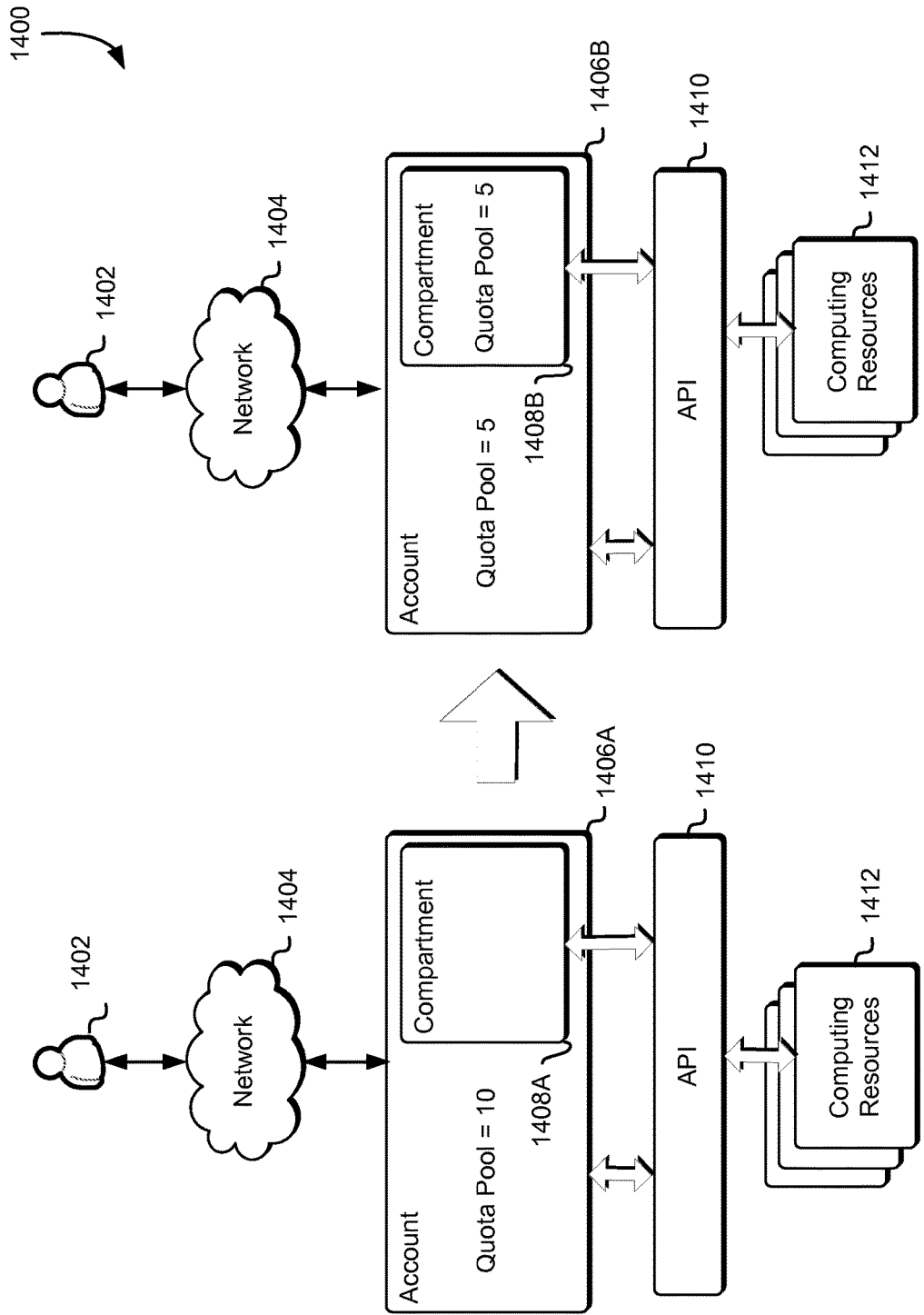
FIG. 14 illustrates an example of quota aggregation in accordance with at least one embodiment.

FIG. 14 illustrates an aspect of an environment 1400 in which an embodiment of the present disclosure may be practiced. As illustrated in FIG. 14, the environment 1400 may include a user 1402 who may access, through a network 1404, an account 1406A of which the user is a member. It is noted that user 1402 may be an individual, system, service, computing device, or other entity authorized to access the account 1406A. Authorization may be determined passing a proper digitally signed credential to an API It is further noted that examples of the network 1404 include the same examples given above for the network 106 in FIG. 1. The account 1406A may also contain one or more compartments 1408A. Both the account 1406A and the one or more compartments 1408A within the account may call an API 1410 to access or instantiate computing resources 1412, and the API 1410 may regard calls from the one or more compartments 1408A as if the calls had been made by the account 1406A, with one exception being that the policies, roles and permissions of the one or more compartments 1408A, generally the same or more restrictive than the policies, roles and permissions of the account 1406A, will be applicable to the one or more compartments 1408A.

In the environment 1400, the account 1406A may have an assigned quota of ten database instances. However, to ensure that the user 1402 does not use up the entire quota pool for the account 1406A, or to ensure that the user 1402 does not exceed the quota for the account 1406A (which may incur an increased billing cost), at least some of the quota from the quota pool of the account 1406A may be assigned to the compartment 1408A, and the user 1402 may then be restricted to only create database instances within that compartment 1408A up to a quota limit, which in this example is five. The compartment 1408B now has a quota limit of five, limiting the parent account 1406B to five database instances at the account level, since five instances of the original quota have been transferred to the compartment 1408B. In aggregate, the quotas assigned to the parent account 1406B and the compartment 1408B equal the total original quota pool of the parent account 1406A. Thus, by assigning a quota to the compartment 1408A from the quota pool of the account 1406A, the parent account 1406B may be assured that the user 1402 will not exhaust the quota pool prematurely.

Figure 15:
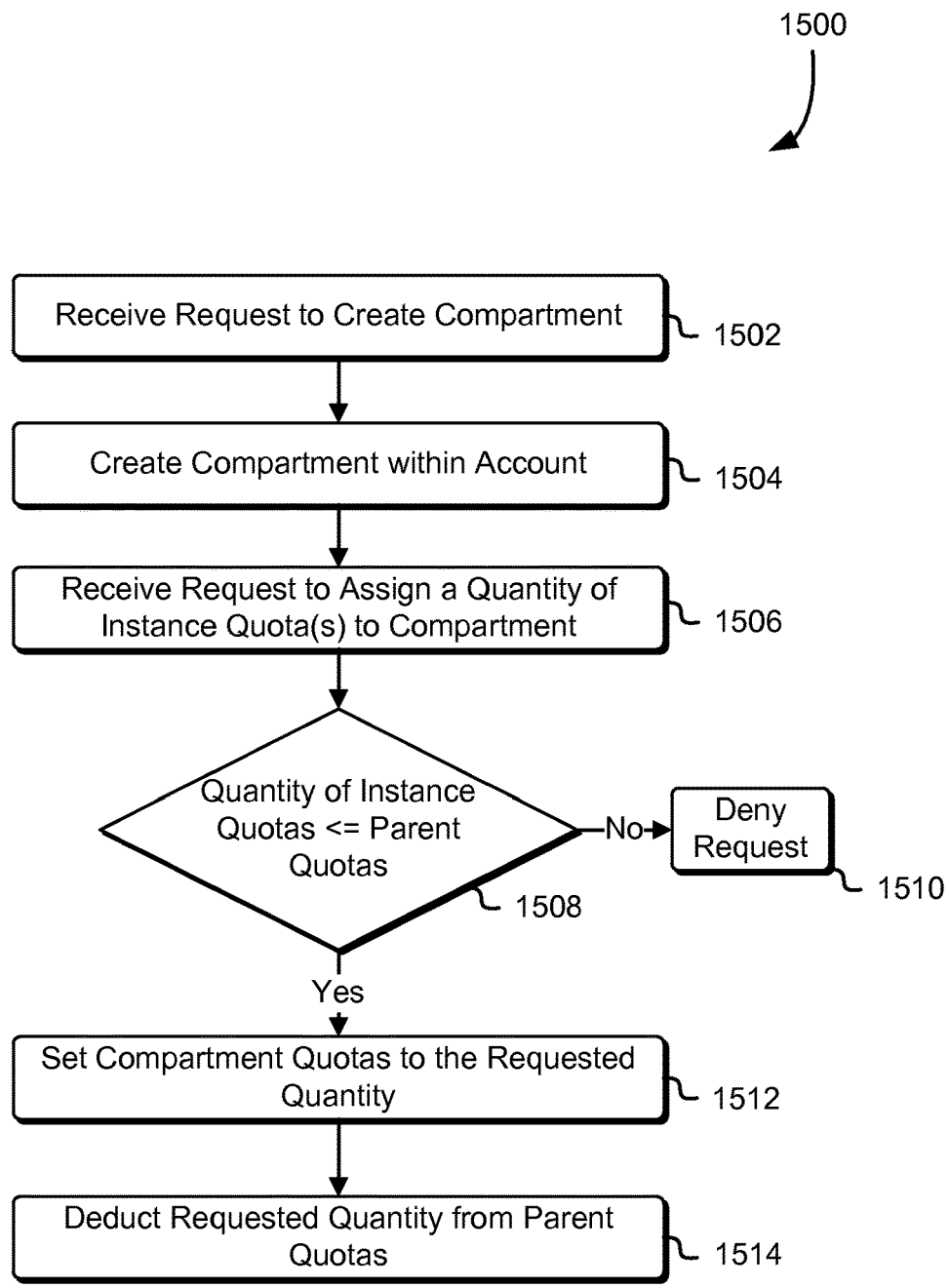
FIG. 15 is a flow chart that illustrates an example of specifying a quota for a compartment in accordance with at least one embodiment.

FIG. 15 is a flow chart illustrating an example of a process 1500 for quota aggregation in accordance with various embodiments. The process 1500 may be performed by any suitable system, which may be an account management service, such as described above, which may be implemented using one or more devices discussed in connection with FIG. 23. The process 1500 includes a series of operations wherein a compartment may be created and assigned a quota from the quota pool of the parent account. In 1502, a device of the system performing the process 1500 receives a request to create a compartment within an account. The process 1500 may be performed to create either a standard compartment or a hidden compartment within an account or another compartment or hidden compartment.

After determining that the requestor is authorized to create a compartment within the account, as may be determined by passing a proper digitally signed credential to an API, the device performing the process 1500 proceeds to 1504, wherein the compartment may be created according to steps similar to the process 700 illustrated in FIG. 7 or process 1300 illustrated in FIG. 13. In 1506, the device performing the process 1500 receives a request to assign a quota to the newly-created compartment. After determining that the requestor is authorized to assign quotas to the compartment, the device performing the process 1500 proceeds to 1504, wherein the computing device verifies that the requested quota amount does not exceed the remaining quota pool of the parent account. If the requested quota amount exceeds the remaining quota pool of the parent account, the device performing the process 1500 proceeds to 1510 to deny the request. In at least one embodiment, the request may not be denied, but rather the quota pool of the parent may be increased by an amount necessary to support the quota amount requested for the child compartment.

Otherwise, if the requested quota amount does not exceed the quota pool of the parent account, the device performing the process 1500 proceeds to 1512, whereupon the compartment may be assigned a quota according to the requested amount, and in 1514, the requested quota amount may be deducted from the quota pool of the parent. In at least one embodiment, the parent quota pool remains the same, but the computing device keeps track of the assigned quota amounts versus the unassigned quota amounts. Note that the operations performed in 1502-1504 and 1506-1514 may be performed in various orders, including in parallel, and each operation may be performed by one or more devices different from the devices performing any of the other operations in process 1500.

Figure 16:
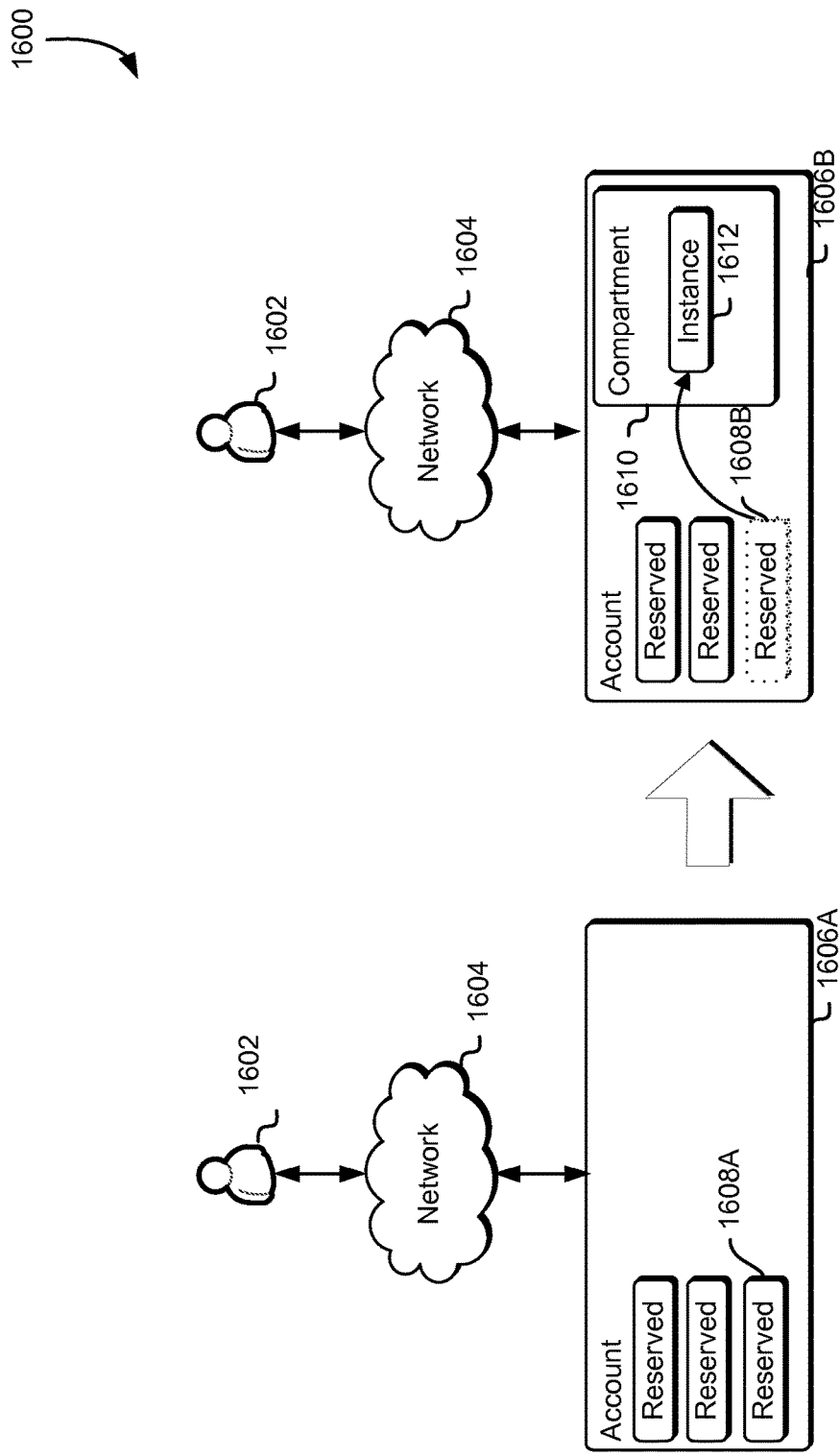
FIG. 16 illustrates an application of long-term commitment instances with compartments in accordance with at least one embodiment.

FIG. 16 illustrates an aspect of an environment 1600 in which an embodiment of the present disclosure may be practiced. As illustrated in FIG. 16, the environment 1600 may include a user 1602 who may access, through a network 1604, an account 1606A of which the user is a member. It is noted that user 1602 may be an individual, system, resource computing device, or other entity authorized to access the account 1606A. Authorization may be determined by passing a proper digitally signed credential to an API. It is further noted that examples of the network 1604 include the same examples given above for the network 106 in FIG. 1. The account 1606A may also contain one or more long-term commitment instances 1608A. In the example environment 1600, a compartment 1610 may be created within the account 1606B. The compartment 1614 may be either a standard compartment or a hidden compartment. At least one of the one or more long-term commitment instances 1608A may be assigned to the compartment 1610 as an instance 1612 that may be instantiated within the compartment 1610, leaving the remaining long-term commitment instances 1608B assigned to the account.

Figure 17:
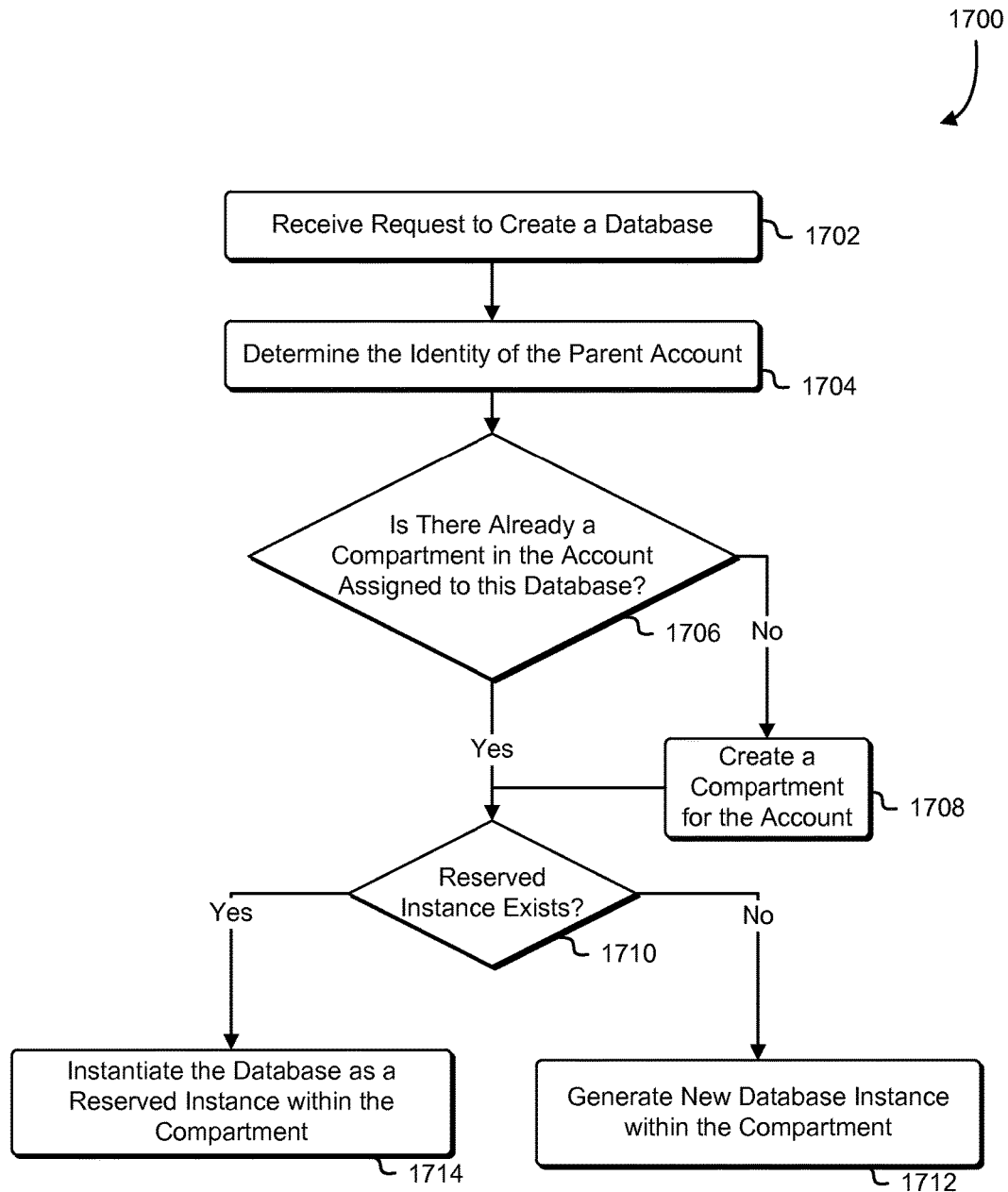
FIG. 17 is a flow chart that illustrates an example use of long-term commitment instances with compartments in accordance with at least one embodiment.

FIG. 17 is a flow chart illustrating an example of a process 1700 for instantiating a long-term commitment instance within a compartment in accordance with various embodiments. The process 1700 may be performed by any suitable system, which may be an account management service, such as described above, database service, or any service with suitable permissions for performing the actions, which may be implemented using one or more devices discussed about FIG. 23. In 1702, a device of the system performing the process 1700 receives a request to create a database within a compartment. The process 1700 may be performed to create a database within either standard compartment or a hidden compartment. As noted, the requestor may be a service making the request in response to a customer request, pending authorization based on the customer's credentials.

After determining that the requestor is authorized to create a database within the compartment, as may be determined by passing a proper digitally signed credential to an API, the device performing the process 1700 proceeds to 1704, wherein the computing device determines the identity of the parent container containing one or more long-term commitment instances. The parent container may be an account, a standard compartment, or a hidden compartment.

In 1706, the device performing the process 1700 checks to determine whether a compartment has already been created for the database. The compartment may be either a standard compartment or a hidden compartment. If no compartment has been created for the database, the device performing the process 1700 proceeds to 1708 whereupon a compartment may be created within the account for the database. Depending upon whether the compartment is to be created as a standard compartment, the process for creating a compartment in 1708 may be similar to the operations performed by process 700 illustrated in FIG. 7 or process 1300 illustrated in FIG. 13.

Once a compartment exists in which to instantiate the database, the device performing the process 1700 proceeds to 1710 wherein the device checks the compartment to determine whether an instance has been reserved in the compartment to be used for the database instantiation. If no instance has been reserved in the compartment, the device performing the process 1700 checks the parent container to determine whether the parent container contains a long-term commitment instance that may be transferred to the compartment to be used for the database instantiation. If parent container contains no long-term commitment instances, the device performing the process 1700 continues to traverse up the hierarchical tree of parent-child container relationships until either a long-term commitment instance usable for instantiating the database is found or the traversal reaches the root node without finding any suitable long-term commitment instances. In at least one embodiment, the traversal of the tree of parent-child container relationships stops after the first parent is checked.

If no long-term commitment instances are found, the device performing the process 1700 proceeds to 1712, whereupon an instance for the new database is dynamically generated within the compartment. Otherwise, the device performing the process 1700 proceeds to step 1714, whereupon the database may be either instantiated as the long-term commitment instance assigned to the compartment, or, if the long-term commitment instance was found elsewhere in the hierarchy, the found long-term commitment instance may be transferred to the compartment and the database instantiated as the long-term commitment instance.

Figure 18:
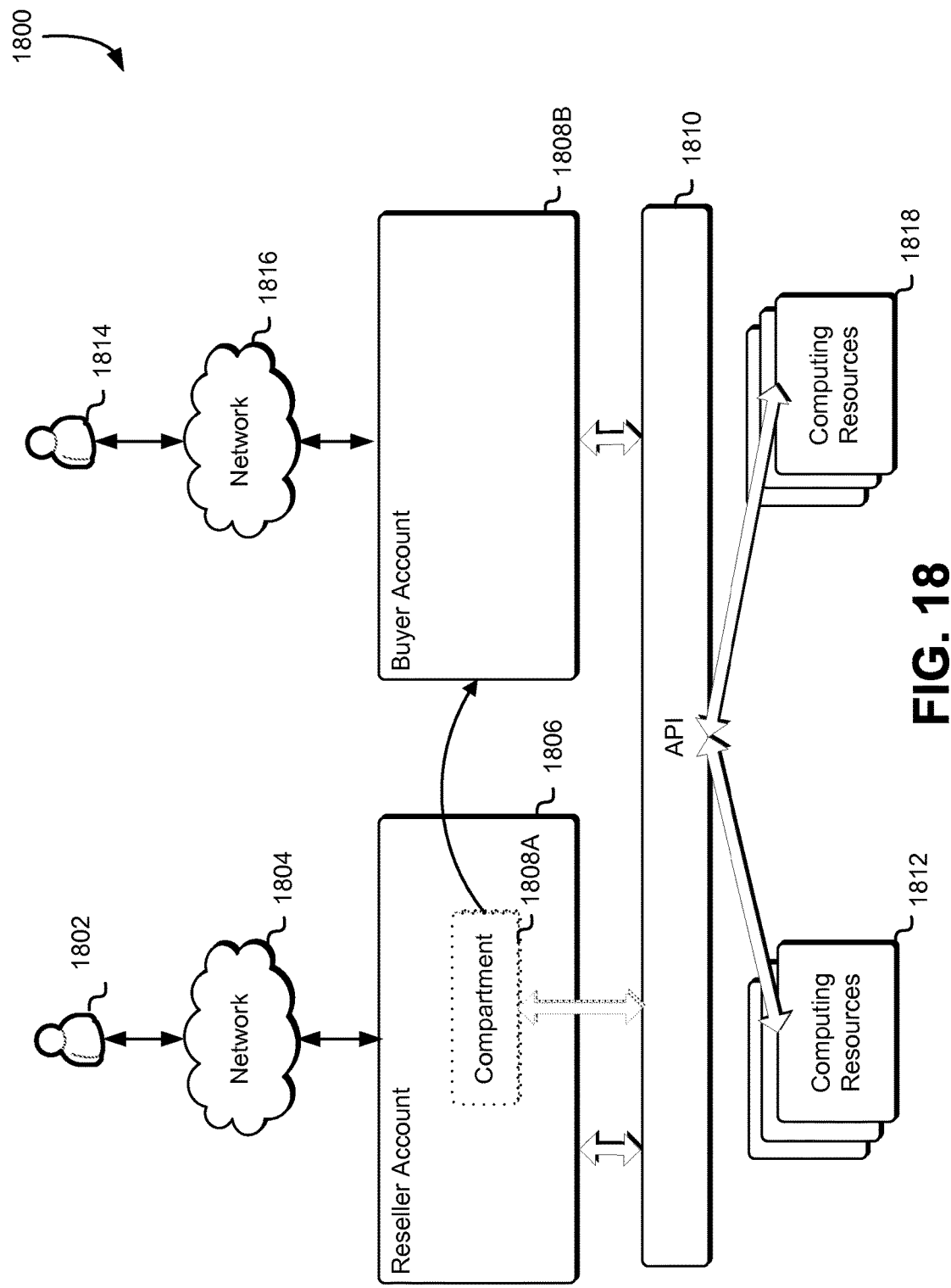
FIG. 18 illustrates an example of conversion of a compartment to an account in a marketplace environment in accordance with at least one embodiment.

FIG. 18 illustrates an aspect of an environment 1800 in which an embodiment of the present disclosure may be practiced. As illustrated in FIG. 18, the environment 1800 may include a user 1802 who may access, through a network 1804, an account 1806 of which the user is a member. It is noted that user 1802 may be an individual, system, service, computing device, or other entity authorized to access the account 1806. Authorization may be determined by passing a proper digitally signed credential to an API. It is further noted that examples of the network 1804 include the same examples given above for the network 106 in FIG. 1. The account 1806 may also contain one or more compartments 1808A. Both the account 1806 and the one or more compartments 1808A within the account may call an API 1810 to access or instantiate computing resources 1812, and the API 1810 may regard calls from the one or more compartments 1808A as if the calls had been made by the account 1806, with one exception being that the policies, roles and permissions of the one or more compartments 1808A, generally the same or more restrictive than the policies, roles and permissions of the account 1806, will be applicable to the one or more compartments 1808.

In the environment 1400, the compartment 1808A may have been configured for resale by the user 1802 with various customized resources. A buyer 1814 may purchase the compartment 1808A, whereupon the compartment 1808A may be transformed into a standalone account 1808B in a manner similar to the process disclosed in FIG. 9 and illustrated in FIG. 5. The account billing records may also be updated to reflect that the buyer 1814 may be the responsible party for costs incurred by the standalone account 1808B.

After the compartment 1808A is converted into a standalone account 1808B, the buyer 1814 may access, through a network 1816, the standalone account 1808B. It is noted that examples of the network 1816 include the same examples given above for the network 106 in FIG. 1, and may either be the same network as the network 1804 or a different network. The standalone account 1808 may call the API 1810 to access or instantiate computing resources 1812, however the API 1810 no longer regards calls from the standalone account 1808A as if the calls had been made by the former parent account 1806.

In at least one embodiment, when the compartment 1808A is purchased by the buyer 1814, the compartment 1808A may be transformed into the standalone account 1808B and account billing services may be configured to indicate that the buyer 1814 will be responsible for future costs incurred by the standalone account 1808B. In at least another embodiment, the compartment 1808A may remain a compartment 1808A under the account 1806, but the buyer 1814 has access to the compartment 1808, and the account billing services may be configured to indicate that the buyer 1814 may be responsible for future costs incurred by the purchased compartment 1808A. As another embodiment that may be combined with various embodiments, the compartment 1808A may be transformed into the standalone account 1808B, but the account 1806 retains permissions sufficient for the user 1802 to upgrade and perform maintenance on the standalone account 1808B as desired. In at least another embodiment, the user 1802 may initiate the request to reassign ownership and billing responsibility for the purchased container 1808. As still another embodiment, combinable with other embodiments, the request to reassign ownership and billing responsibility may be performed by an automated process initiated by one or more actions by the buyer 1814, such as clicking through a web marketplace interface.

Figure 19:
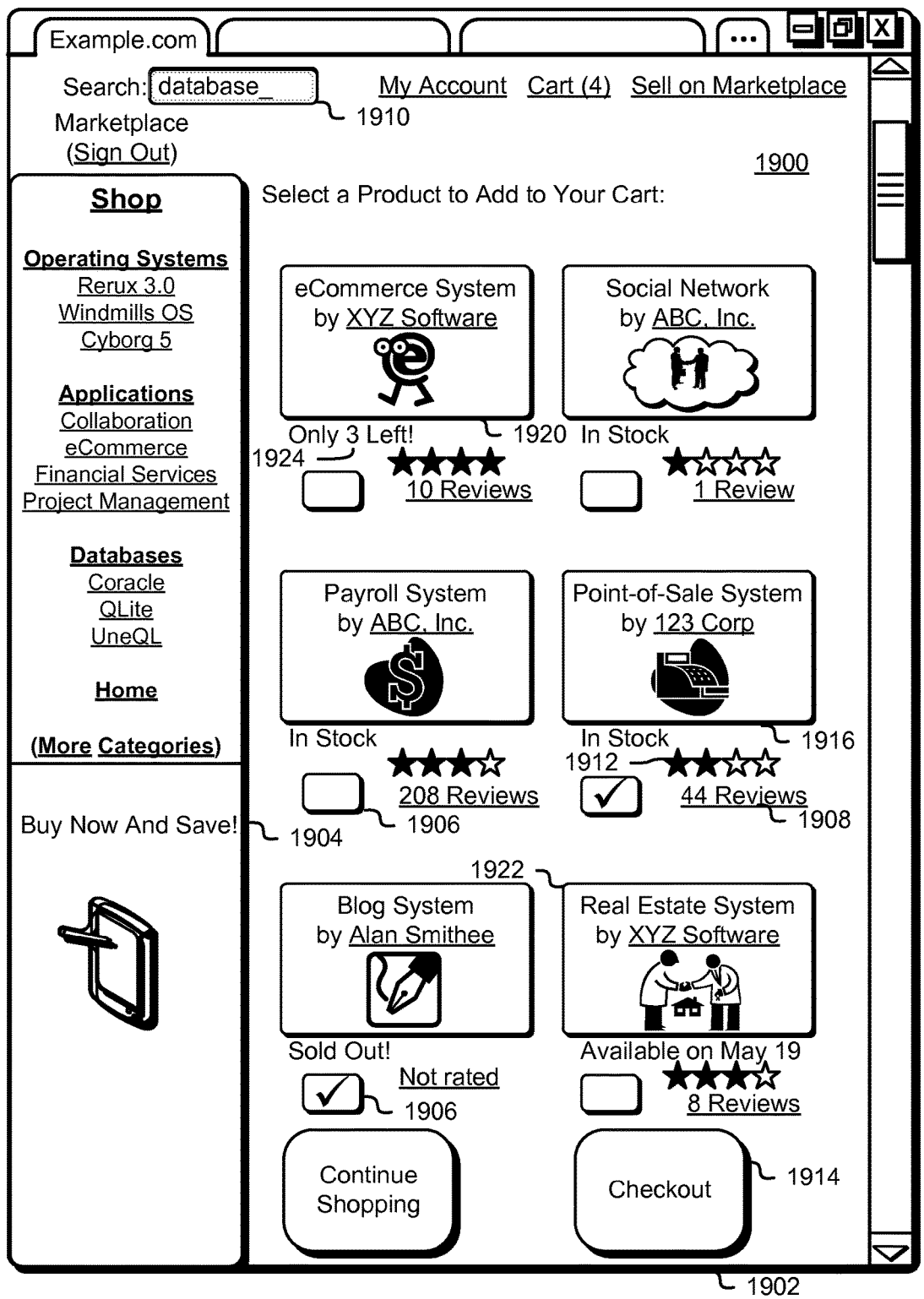
FIG. 19 is an illustration of an example marketplace that may be used by buyers and sellers of compartments in accordance with at least one embodiment.

FIG. 19 illustrates an aspect of an online marketplace 1900 in which an embodiment of the present disclosure may be practiced. As illustrated in FIG. 19, the online marketplace 1900 may include a web page 1902 of a website which may be used to provide access to the online marketplace 1900. The web page 1902 may include various graphical elements for enabling a user to navigate the online marketplace 1900 to find, purchase, and use preconfigured compartments. Note that interface elements are not limited to the graphical or textual elements as illustrated, but may be textual elements, graphical elements, animations, audible or haptic feedback regions, applications, and other elements which may be utilized with a web page. The web page 1902 may be displayed by various devices and applications, including, but not limited to, web browsers executing on a computing device and mobile applications executing on tablets and cellular telephones.

The online marketplace 1900 may feature user-friendly interface elements such as the different categories 1904 displayed in a left-side column on the web page 1902. Examples of different categories 1904 which may be used to organize and navigate the online marketplace 1900 include, but are not limited to, such categories 1904 as categories for compartments configured to host a particular operating system, categories for applications configured to execute within a compartment, categories for databases configured to be hosted within a compartment, and other categories as desired for organization and other purposes. Note that these categories 1904 are non-limiting and used for illustrative purposes only.

The online marketplace 1900 may feature selection mechanisms including, but not limited to, graphical or hypertext markup language form elements such as radio-type buttons, checkboxes 1906, dropdown lists, listboxes, multiselect boxes. The online marketplace 1900 may further feature such elements as textboxes for writing reviews 1908 and search boxes 1910 for performing text or image searches. The online marketplace 1900 may further include features to aid comparison shopping, such as reviews, like reviews viewable by clicking the review link 1908, of products which may be viewed and/or created by consumers, ratings, like the star rating 1912, and pricing information. Users may select their desired compartment and purchase by clicking an icon, button, or checkbox 1906 on the online marketplace. Users may further select to complete and pay for their purchase by clicking an interface element, such as checkout button 1914.

The online marketplace 1900 may host compartments for sale by different owners of accounts with a computing resource service provider. The different account owners may have compartments listed for sale on the online marketplace 1900 which have been configured by the account owners under their own account. In this illustration of an online marketplace 1900, an account owner, 123 Corp, has configured a "Point-of-Sale System" in a compartment and has offered it as a purchasable compartment 1916 for sale on the online marketplace 1900. The purchasable compartment 1916 has been given an average rating 1912 of two stars by consumers, 44 of which have posted reviews which may be read by potential buyers by clicking the review link 1908 labeled "44 Reviews." Likewise, XYZ Software has offered an "eCommerce System" purchasable compartment 1920 and a "Real Estate System" purchasable compartment 1922 for sale on the online marketplace 1900. The purchasable compartment 1920 has been given an average rating of four stars by consumers, ten of which have posted reviews. The online marketplace 1900 may further be configured to display inventory information, such as the notification 1924 corresponding to the purchasable compartment 1920 that notifies consumers that only three compartments are left in stock. Other inventory information that may be displayed includes, but is not limited to, notifications that a product is in stock, sold out, or expected to be available for purchase on a certain date.

Furthermore, the online marketplace 1900 may be configured to notify the seller when the inventory of a particular compartment is sold out. In one example, the seller may be further notified when inventory stocks of a particular compartment drop below a threshold quantity. In another example, the seller may be notified when a consumer rates or reviews a product. In still another example, the seller may add responses to reviews of its products.

The online marketplace may allow a buyer to complete the purchase transaction by clicking an interface element, such as the checkout button 1914. Clicking this button may take the buyer to a different web page where the buyer may enter payment information, such as credit card information, select various options and/or accessories for the selected products, and review the order before executing the transaction. In at least one embodiment, after the transaction is executed, the compartment may be converted into an account. In at least another embodiment, after the transaction is executed, the compartment may remain a compartment within a parent container. As another embodiment that may be combined with various embodiments, the buyer may also enter information about users, roles, and policies for each compartment purchased at this time. As another embodiment, combinable with other embodiments, multiple compartments may be selected to be installed in an account. In at least another embodiment, multiple compartments may be selected, any or all of which may be installed within one or more separate accounts.

Figure 20:
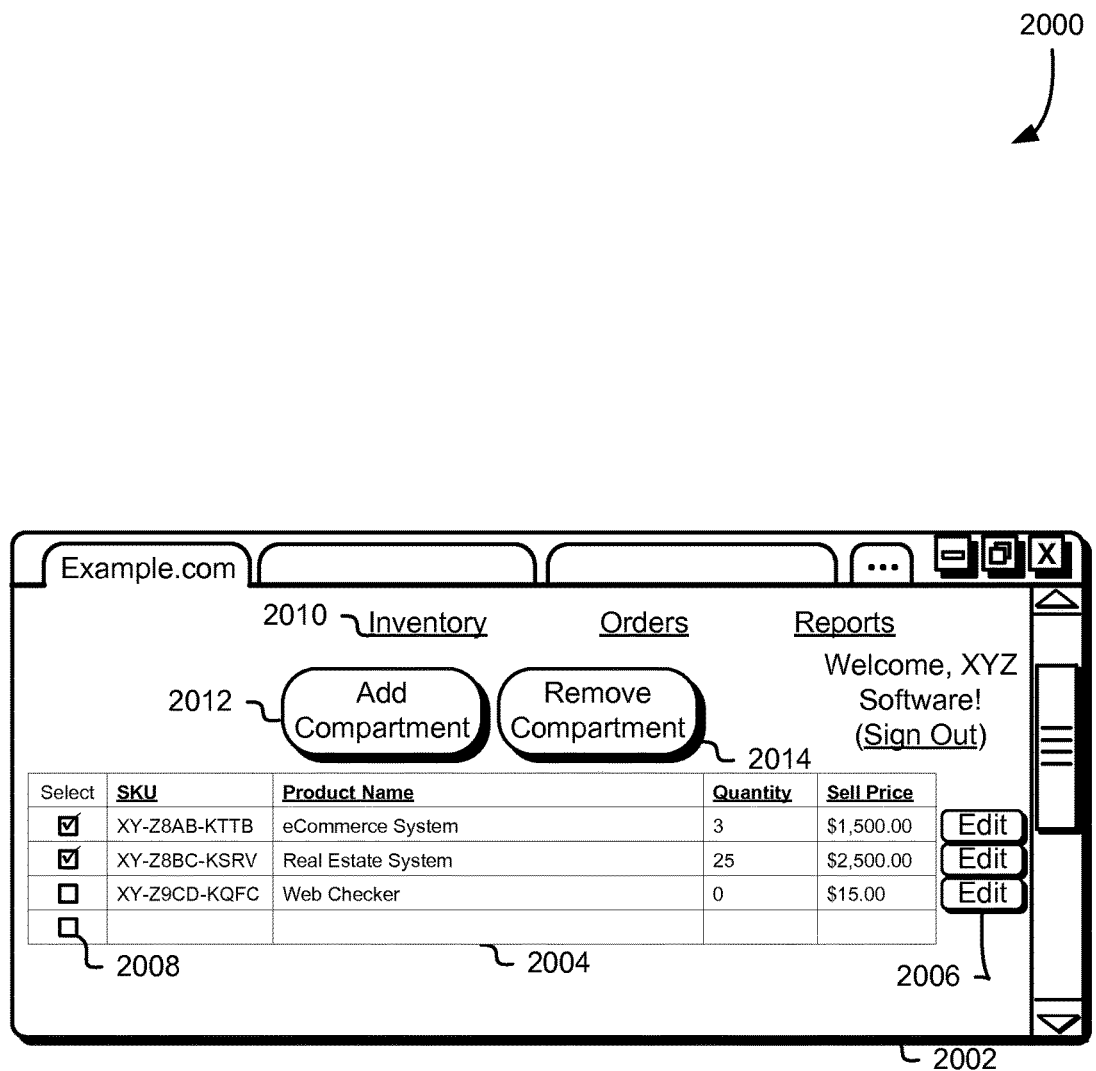
FIG. 20 is an illustration of an example interface that may be used by sellers to list compartments for sale on an online marketplace in accordance with at least one embodiment.

FIG. 20 illustrates an aspect of an online marketplace 2000 in which an embodiment of the present disclosure may be practiced. As illustrated in FIG. 20, the online marketplace 2000 includes a seller web page 2002 which may include various graphical elements for enabling a seller to list compartments configured by the seller for sale on the online marketplace. Note that interface elements are not limited to the graphical or textual elements as illustrated, but may be textual elements, graphical elements, animations, audible or haptic feedback regions, applications, and other elements which may be utilized with a web page. The web page 2002 may be displayed by various devices and applications, including, but not limited to, web browsers executing on a computing device and mobile applications executing on tablets and cellular telephones.

The online marketplace 2000 may feature interface elements for the seller web page 2002, such as a table 2004 listing the compartments the seller has offered for sale, including information such as stock-keeping unit (SKU) numbers, product names, quantity available for purchase, and the sell price. The seller may be able to modify the sell price, quantity available, product name, and SKU number by clicking an interface element, such as an edit button 2006. Additional interface elements may be present, such as checkboxes 2008 for selections of products for deletion, editing, activating, or inactivating inventory items from the marketplace. In one example, the online marketplace 2000 may have additional promotional features, such as options for creating special sales, options for creation of particular promotions and discounts, and options for offering and accepting gift cards and coupons for the seller's products.

The online marketplace 2000 may feature interface elements for the seller web page 2002, such as a menu bar 2010 for selecting different screens and web pages for aiding the seller in managing products, such as a page listing the seller's inventory, a page listing the current orders buyers have made of the seller's products, and a reports page for displaying historical information and sales trends of the seller's products.

The online marketplace 2000 may feature interface elements for the seller web page 2002 to enable sellers to select compartments they have configured for sale, such as an add compartment button 2012. After clicking such an interface element, the seller may be prompted with another interface allowing the seller to choose one or more compartments from a listing of available compartments the seller has created and/or configured. In one example, the seller may obtain or purchase compartments from another seller and make them available for resale.

The online marketplace 2000 may further feature interface elements for the seller web page 2002 to enable sellers to remove compartments from inventory, such as a remove compartments button 2014. A seller may choose to remove compartments from inventory for various reasons, including, but not limited to, software installed within the compartment may be obsolete and need to be updated, the seller no longer wishing to sell the particular compartment, or the compartment was listed for sale as a limited promotion which has now ended.

Figure 21:
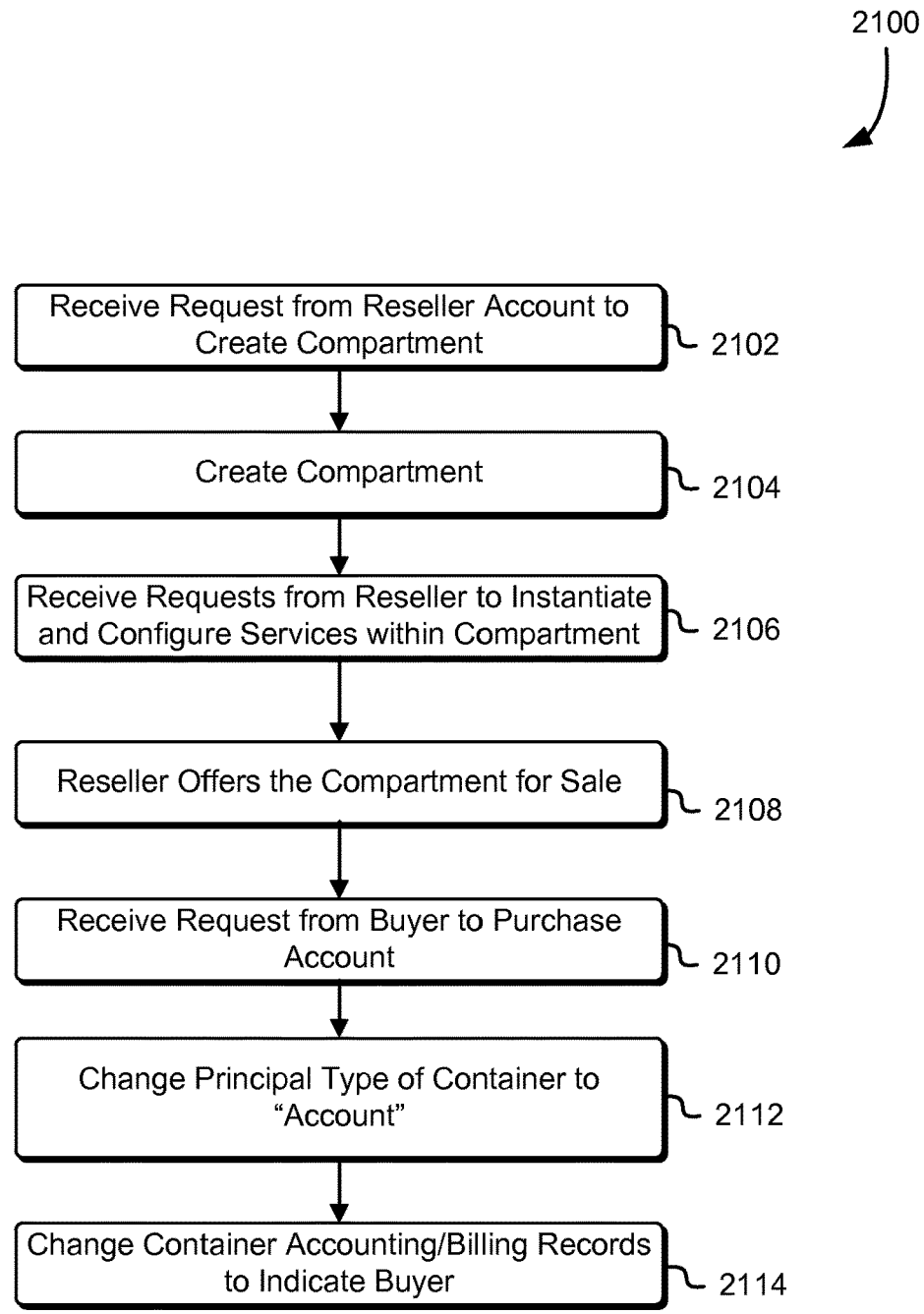
FIG. 21 is a block diagram that illustrates an example of a process of converting the compartment of a reseller to an account of a buyer in a marketplace environment.

FIG. 21 is a block diagram illustrating an example of a process 2100 for selling compartments in a marketplace in accordance with various embodiments. The process 2100 may be performed by any suitable system, which may be an account management service, such as described above, a marketplace transaction service, or any service with suitable permissions for performing the actions, which may be implemented using one or more devices discussed about FIG. 23. In 2102, a device of the system the process 2100 receives a request to create a compartment in a reseller account. The type of compartment requested may be either a standard compartment or a hidden compartment.

After determining that the requestor is authorized to have a compartment created within the account, as may be determined by passing a proper digitally signed credential to an API, the device performing the process 2100 proceeds to 2104 whereupon the device performing the process 2100 creates a compartment within the account according to a process similar to the processes disclosed in FIGS. 7 and 13. In 2106, the requestor or other authorized user instantiates zero or more resources within the compartment, customizing the resources as desired by the requestor.

After the compartment and its resources have been configured to the satisfaction of the requestor, in 2108, the requestor may offer the compartment up for sale. For example, the compartment may be purchasable from a marketplace website.

In 2110, the device performing the process 2100 receives a request from a buyer to purchase the compartment. In one example, the request may be received from a buyer through a marketplace website. In another example, the request may be a notification from the reseller account that the buyer has purchased the compartment.

In 2112, the device performing the process 2100 transforms the purchased compartment into a standalone account. In the illustrated embodiment, the device performing the process 2100 may transform the compartment into an account by changing the principal type of one or more records of the compartment to a type of "Account." In still another example, a field in one or more records indicating the parent container of the compartment may be updated to reflect that the standalone account has no parent. As another example, an additional field may be updated to reflect the transformation of the container into the standalone account.

In 2114, the device performing the process 2100 updates one or more accounting billing records to reflect that the buyer of the compartment (now the standalone account) will be responsible for costs incurred by the container. Note that the operations performed in the steps of the process 2100 may be performed in various orders, including in parallel, and each operation may performed by one or more devices different from the devices performing any of the other operations in process 2100.

Figure 22:
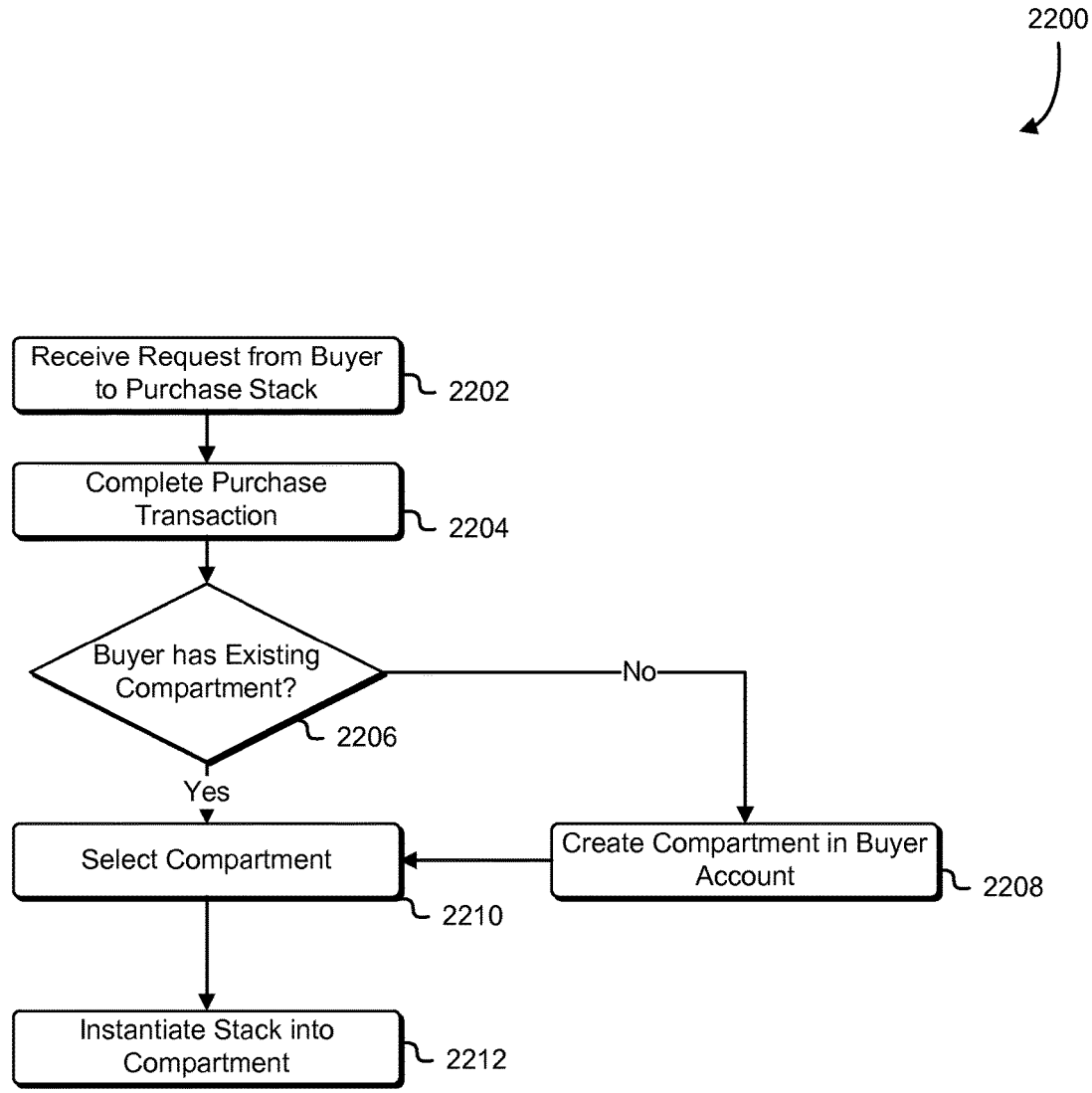
FIG. 22 is a flow chart that illustrates an example of a process of purchasing a stack for instantiation into a compartment of a buyer through an online marketplace.

FIG. 22 is a flow chart illustrating an example of a process 2200 for purchasing a stack for instantiation within one or more compartments in accordance with various embodiments. The process 2200 may be performed by any suitable system, which may be an account management service, such as described above, a marketplace transaction service, or any service with suitable permissions for performing the actions, which may be implemented using one or more devices discussed about FIG. 23. In 2202, a device of the system performing the process 2200 may receive a request that an entity, such as a buyer, has purchased at least one stack from an online marketplace. An online marketplace for selling stacks may appear similar to the online marketplace depicted in FIG. 19, but that the products may be stacks rather than compartments. In one example, multiple stacks may be selected to be installed into a compartment. In another example, multiple stacks may be selected, any or all of which may be installed into one or more separate compartments.

In 2204, the purchase transaction of the stack is completed. In one example, the buyer may be allowed to specify one or more compartments, quotas, long-term commitment instances, and hardware requirements for the purchased stack. Upon completion of the purchase transaction, the device performing the process 2200 proceeds to 2206, wherein the device queries whether the buyer has an existing one or more compartments within a container allocated or usable for an instantiation of the purchased stack. If no suitable compartment or compartments are found, the device performing the process 2200 proceeds to step 2208, wherein one or more compartments may be created according to steps similar to the process 700 illustrated in FIG. 7 or process 1300 illustrated in FIG. 13 in the buyer account as needed. Note that the type of compartment usable for instantiating a stack may be either a standard compartment or a hidden compartment, as may be determined by the buyer, the computing resource service provider, the seller, parameters of the stack, or of the particular requirements of the resources being instantiated according to the stack or stack template, or any combination of the above. In one example, multiple compartments may be required or generated in response to purchasing a stack. In another example, the stack template may specify the type and number of compartments to be created. In still at least another example, one or more compartments may be created within a parent container of the seller account and ownership of the one or more compartments may be transferred to the buyer according to steps similar to the process 900 illustrated in FIG. 9. As another example, the stack may specify quotas for one or more compartments created according to steps similar to process 1500 in FIG. 15.

In 2210, the one or more existing and/or newly-created compartments may be selected by the device performing process 2200. In 2212, the device performing the process 2200 may instantiate the stack into the one or more selected compartments according to parameters of the stack or stack template and/or parameters specified by the buyer. In another embodiment, the instantiation of resources within the compartment are performed using one or more long-term commitment instances as illustrated in environment 1600 of FIG. 16 or according to steps similar to process 1700 in FIG. 17. In at least another embodiment, the stack may be instantiated within one or more compartments are created within a parent container of the seller and the buyer accesses the purchased stack through the parent container. In such an embodiment, the buyer may be billed by the seller for costs incurred by the stack instantiations rather than be billed by the computer resource provider.

Figure 23:
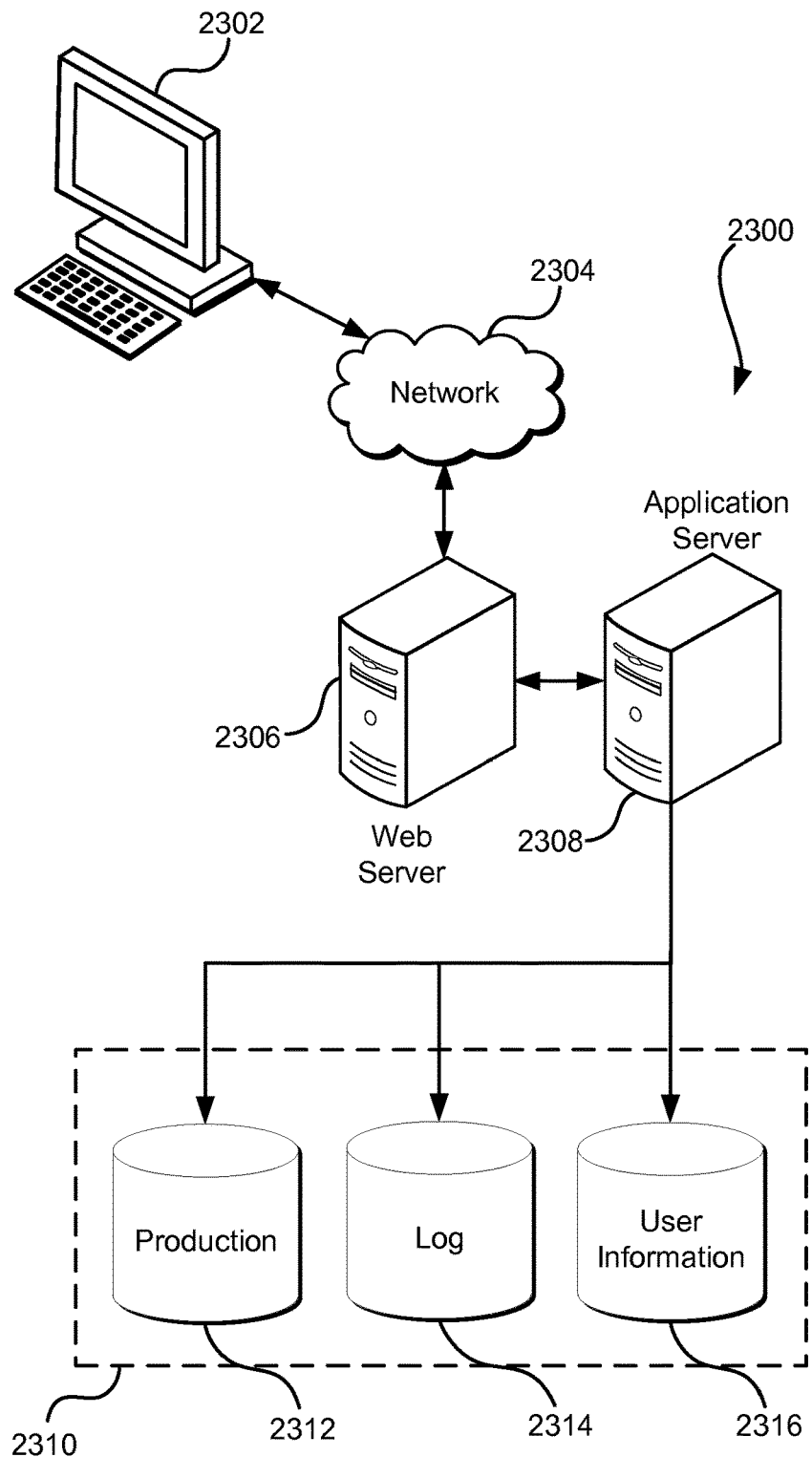
FIG. 23 illustrates an environment in which various embodiments can be implemented.

FIG. 23 illustrates aspects of an example environment 2300 for implementing aspects in accordance with various embodiments. As will be appreciated, although a web-based environment is used for purposes of explanation, different environments may be used, as appropriate, to implement various embodiments. The environment includes an electronic client device 2302, which can include any appropriate device operable to send and/or receive requests, messages or information over an appropriate network 2304 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 2306 for receiving requests and serving content in response thereto, although for other networks an alternative device serving a similar purpose could be used as would be apparent to one of ordinary skill in the art.

The illustrative environment includes at least one application server 2308 and a data store 2310. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computing systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 2302 and the application server 2308, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 2310 can include several separate data tables, databases, data documents, dynamic data storage schemes and/or other data storage mechanisms and media for storing data relating to a particular aspect of the present disclosure. For example, the data store illustrated may include mechanisms for storing production data 2312 and user information 2316, which can be used to serve content for the production side. The data store also is shown to include a mechanism for storing log data 2314, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 2310. The data store 2310 is operable, through logic associated therewith, to receive instructions from the application server 2308 and obtain, update or otherwise process data in response thereto. The application server 2308 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 2302. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in at least one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 23. Thus, the depiction of the system 2300 in FIG. 23 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a first service of a computing resource service provider, a first application programming interface request to provision a first computing resource for an account of the first service;
   creating a compartment within the account to be utilized by the first service, wherein creating the compartment comprises creating a role such that the role is assumable by the first service and creating a trustee policy within the compartment that limits direct control of an administrator of the account to access the first computing resources provisioned in the compartment;
   associating the compartment with a set of permissions that grant access to provision a second computing resource of a second service in the compartment, wherein the administrator of the account lacks an ability to obtain the grant of access to provision the second computing resource in the compartment;
   associating the compartment with the role usable to perform at least one operation within the compartment;
   associating the first service with the role; and
   transmitting, by the first service in association with the role, a second application programming interface request to the second service, thereby causing the second service to provision the second computing resource in the compartment as part of fulfillment of the first application programming interface request.

2. The computer-implemented method of claim 1, further comprising:
   obtaining an application programming interface request to delete the first computing resource; and
   as a result of obtaining the application programming interface request to delete the first computing resource, transmitting an application programming interface request to delete the compartment, the application programming interface request to delete the compartment being associated with the role.

3. The computer-implemented method of claim 1, wherein determining the compartment of the account comprises transmitting an application programming interface request to create the compartment.

4. A system, comprising one or more non-transitory machine-readable mediums comprising a set of instructions, which as a result of execution by one or more processors, cause the system to at least:
   create a compartment to be utilized by a service of a service provider, wherein the compartment is created within an account of the service provider, further wherein the compartment is created by at least creating a role such that the role is assumable by the service and creating a trustee policy within the compartment that limits direct control of an administrator of the account to access a computing resource provisioned in the compartment, the compartment being associated with an access control policy that indicates a grant of access for the service of the service provider to perform one or more operations on the computing resource, wherein the administrator of the account lacks an ability to obtain the grant of access to perform the operation on the computing resource; and
   enforce the trustee policy.

5. The system of claim 4, wherein the computing resource is hosted by a second service different from the service.

6. The system of claim 4, wherein the instructions, which as a result of execution by the one or more processors, further cause the system to aggregate computing resource usage data based at least in part on usage of the computing resource.

7. The system of claim 4, wherein the instructions, which when performed by the one or more processors, further cause the system to:
obtain a request to transfer the compartment to a different account of the service provider; and
as a result of obtainment of the request:
dissociate the compartment from the account; and
associate the compartment with the different account.

8. The system of claim 4, wherein the instructions, which when performed by the one or more processors, further cause the system to associate the compartment with an other compartment, wherein the other compartment is able to obtain the grant of access to perform the operation on the computing resource.

9. The system of claim 4, wherein the operation includes provisioning of a set of computing resources and adding the set of computing resources provisioned to the access control policy to grant the service access to perform the one or more operations.

10. The system of claim 4, wherein:
the service is a marketplace service that provides an interface through which multiple compartments are provided for selection for placement into the account; and
the service performs the one or more operations as a result of selection of the compartment of the multiple compartments.

11. The system of claim 4, wherein:
the system further comprises the service; and
the service causes provisioning of a set of computing resources by transmitting one or more application programming interface calls to one or more other services that each host at least one of the set of computing resources.

12. The system of claim 4, wherein the instructions, which when performed by the one or more processors, further cause the system to provide, to the account, an inventory of the account specifying one or more individual compartments of a set of compartments within the account, wherein the compartment is excluded from the inventory.

13. One or more non-transitory computer-readable storage media comprising executable instructions that, as a result of execution by one or more processors of a computer system, cause the computer system to at least:
obtain a request to perform an operation in connection with a set of computing resources provisioned to a compartment within an account of a service, wherein metadata associated with the compartment specifies a set of restrictions that allow the operation to be performed under authority of the service but that prohibit the operation to be performed under authority of an administrator of the account, wherein a role is assumable by the service and the metadata comprises a trustee policy that limits direct control of the administrator of the account to access the set of computing resources; and
cause the request to be fulfilled as a result of the request being verified as generated under authority of the service.

14. The one or more non-transitory computer-readable storage media of claim 13, wherein the operation includes provisioning an additional computing resource in the set of computing resources.

15. The one or more non-transitory computer-readable storage media of claim 13, wherein the set of computing resources comprises multiple computing resources, at least two of which are hosted by different services.

16. The one or more non-transitory computer-readable storage media of claim 13, wherein the instructions further include instructions that cause the computer system to disassociate the compartment from the account and associate the compartment with another account, thereby causing a transfer of the compartment from the account to the other account.

17. The one or more non-transitory computer-readable storage media of claim 13, wherein the instructions further include instructions that cause the computer system to transfer the compartment to the account by associating the compartment with the account.

18. The one or more non-transitory computer-readable storage media of claim 13, wherein the instructions further include instructions that cause the computer system to count at least one computing resource of the compartment against a quota enforced by the computer system for the account.

19. The one or more non-transitory computer-readable storage media of claim 13, wherein the instructions further include instructions that cause the computer system to create the compartment in the account contingent on verification of a pending customer request to the service.

20. The computer-implemented method of claim 1, wherein the trustee policy restricts the administrator from viewing the compartment as existing within the account.

* * * * *